United States Patent
Ten-Pow et al.

(10) Patent No.: US 9,928,247 B2
(45) Date of Patent: Mar. 27, 2018

(54) SYSTEM AND METHOD FOR DELETION OF EXTRANEOUS DELETE MARKER OBJECTS

(71) Applicant: Amazon Technologies, Inc., Seattle, WA (US)

(72) Inventors: Michael A. Ten-Pow, Seattle, WA (US); Derek Ernest Denny-Brown, II, Seattle, WA (US); Jason G. McHugh, Seattle, WA (US); Praveen Kumar Gattu, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/727,651

(22) Filed: Jun. 1, 2015

(65) Prior Publication Data
US 2015/0261749 A1    Sep. 17, 2015

Related U.S. Application Data

(63) Continuation of application No. 13/076,331, filed on Mar. 30, 2011, now Pat. No. 9,047,312.

(51) Int. Cl.
*G06F 17/30* (2006.01)
*G06F 11/14* (2006.01)

(52) U.S. Cl.
CPC ...... *G06F 17/3015* (2013.01); *G06F 17/3023* (2013.01); *G06F 17/30117* (2013.01); *G06F 11/1448* (2013.01)

(58) Field of Classification Search
CPC .......... G06F 17/3015; G06F 17/30117; G06F 17/3023; G06F 11/1448
See application file for complete search history.

(56) References Cited

U.S. PATENT DOCUMENTS 5,890,166 A * 3/1999 Eisenberg ......... G06F 17/30309
7,840,543 B2   11/2010 Guiheneuf et al.
(Continued)

OTHER PUBLICATIONS

"Managing Tombstones", From MSDN Library, Downloaded Mar. 21, 2011 from: http://msdn.microsoft.com/en-us/library/bb902838(v=sql.100).aspx, pp. 1-4.
(Continued)

*Primary Examiner* — Alexander Khong
(74) *Attorney, Agent, or Firm* — Robert C. Kowert; Meyertons, Hood, Kivlin, Kowert & Goetzel, P.C.

(57) ABSTRACT

Systems and methods for providing object versioning in a storage system may support the logical deletion of stored objects through the use of delete marker objects. In response to a delete operation specifying a key, but not a version identifier, the storage system may create a delete marker object that is stored as the latest object version of the key. In response to performing a subsequent mutating operation, or at pre-determined time intervals, the storage system may perform a local and/or a global analysis of the delete marker objects stored in the system (and/or metadata associated with those delete marker objects) to determine whether any of them are no longer needed to ensure correct operation of the system. The analysis may apply one or more reap conditions to delete marker objects and/or metadata to identify extraneous delete marker objects, removing those that meet one or more reap conditions from storage.

20 Claims, 9 Drawing Sheets

(56) References Cited

U.S. PATENT DOCUMENTS

| | | |
|---|---|---|
| 2002/0073110 A1 | 6/2002 | Duvillier et al. |
| 2002/0103814 A1 | 8/2002 | Duvillier et al. |
| 2003/0061245 A1 | 3/2003 | Soria et al. |
| 2004/0177100 A1 | 9/2004 | Bjorner et al. |
| 2005/0262165 A1 | 11/2005 | Scott et al. |
| 2007/0192544 A1 | 8/2007 | Frolund et al. |
| 2008/0005199 A1* | 1/2008 | Chen ............... G06F 17/30581 |
| 2009/0043977 A1 | 2/2009 | Kamay et al. |
| 2010/0070698 A1 | 3/2010 | Ungureanu et al. |
| 2010/0082553 A1 | 4/2010 | Beatty et al. |
| 2010/0169288 A1 | 7/2010 | Brown |
| 2010/0268820 A1 | 10/2010 | Shi et al. |
| 2011/0289052 A1* | 11/2011 | Rambacher ....... G06F 17/30575 707/624 |

OTHER PUBLICATIONS

"Distributed deletes in the Cassandra database", From Jonathan Ellis's Programming Blog, Updated Feb. 8, 2010, Downloaded Mar. 21, 2011 from: http://spyced.blogspot.com/2010/02/distributed-deletes-in-cassandra.html, pp. 1-3.

"Lingering Object", From UTOOLS, Downloaded Mar. 21, 2011 from: http://utools.com/help/LingeringObjects.asp, pp. 1-2.

Definition of "Tombstone-Lifetime" Attribute, From MSDN Library, Downloaded Mar. 21, 2011 from: http://msdn.microsoft.com/en-us/library/ms680306(v=vs.85).aspx, pp. 1-3.

U.S. Appl. No. 13/076,331, filed Mar. 30, 2011, Michael A. Ten-Pow, et al.

\* cited by examiner

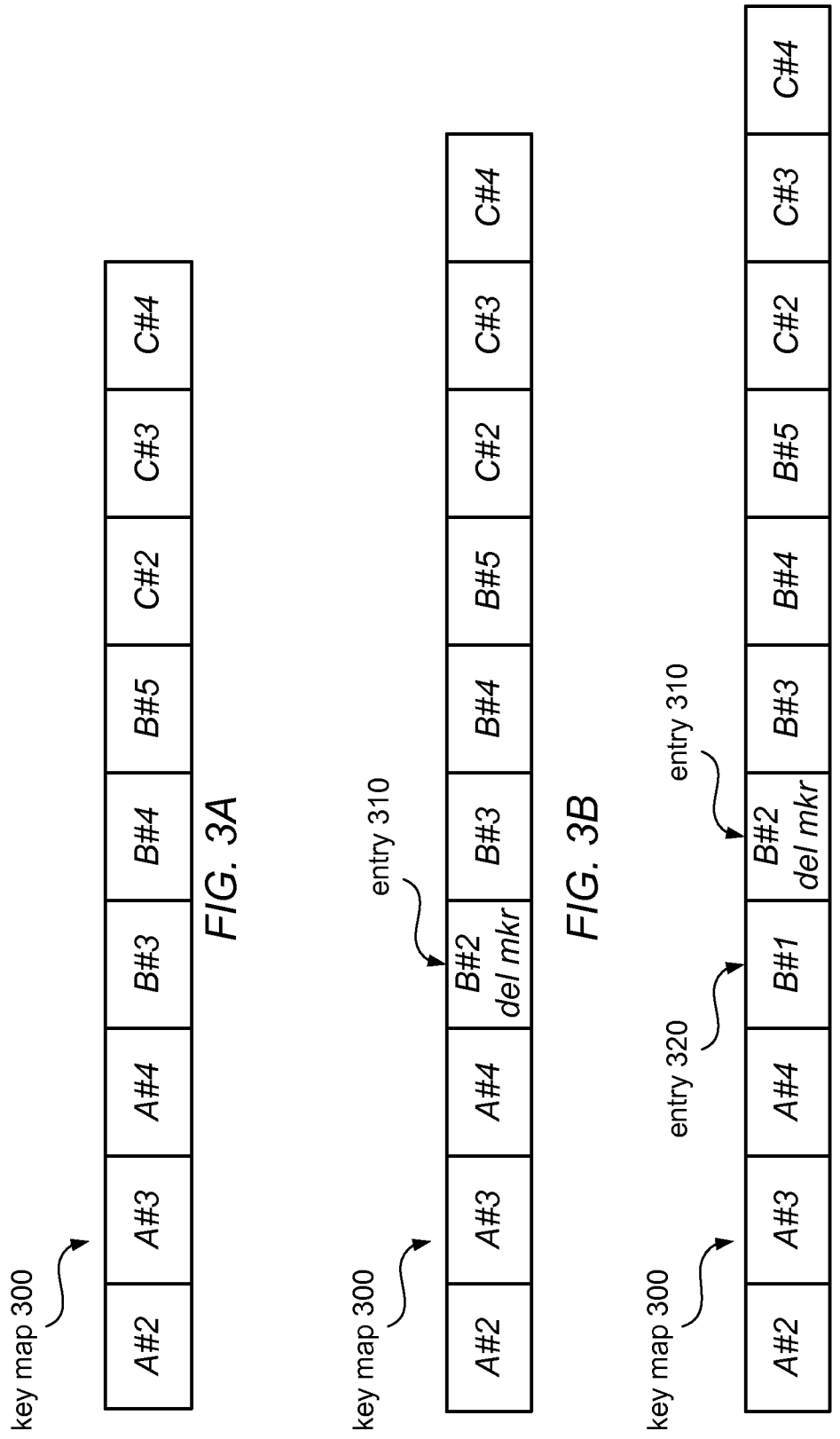

SYSTEM AND METHOD FOR DELETION OF EXTRANEOUS DELETE MARKER OBJECTS

This application is a continuation of U.S. patent application Ser. No. 13/076,331, filed Mar. 30, 2011, now U.S. Pat. No. 9,047,312, which is hereby incorporated by reference in its entirety.

BACKGROUND

Online and other remote data storage services have become widely available in recent years. In a typical model, a storage service may provide storage for backup data, which may be retrieved in the event of a hardware failure, an accidental deletion of data, or data loss as a result of a security breach or other malicious act. Storage services may also provide long-term remote storage for archival or historical purposes. Some storage services, and their underlying storage systems, support the storing of multiple versions of a file or other stored data for simple backup and recovery services, but they typically do not support access to, and/or control over, multiple versions of a file or other stored data.

The term "tombstone" is sometimes used to refer to an entity that represents a deletion of stored data. Tombstones are sometimes used in distributed storage systems to ensure that deletions are performed consistently across separate data store instances. For example, when an anti-entropy process is reconciling two separate data store instances, the existence of a tombstone in the up-to-date data store may trigger the creation of an analogous tombstone in the out-of-date data store. Without such a tombstone, a deletion of a data element in the up-to-date data store could be reconciled away due to the existence of the data element in the out-of-date data store. The typical process for tombstone deletion in distributed systems involves a tombstone time-to-live (TTL), whose value may be chosen based upon the expected time for a successful round of the system anti-entropy protocol to execute.

BRIEF DESCRIPTION OF THE DRAWINGS

FIGS. 3A-3C illustrate examples of the ordering of the elements in a key map, according to one embodiment.

Figure 1:
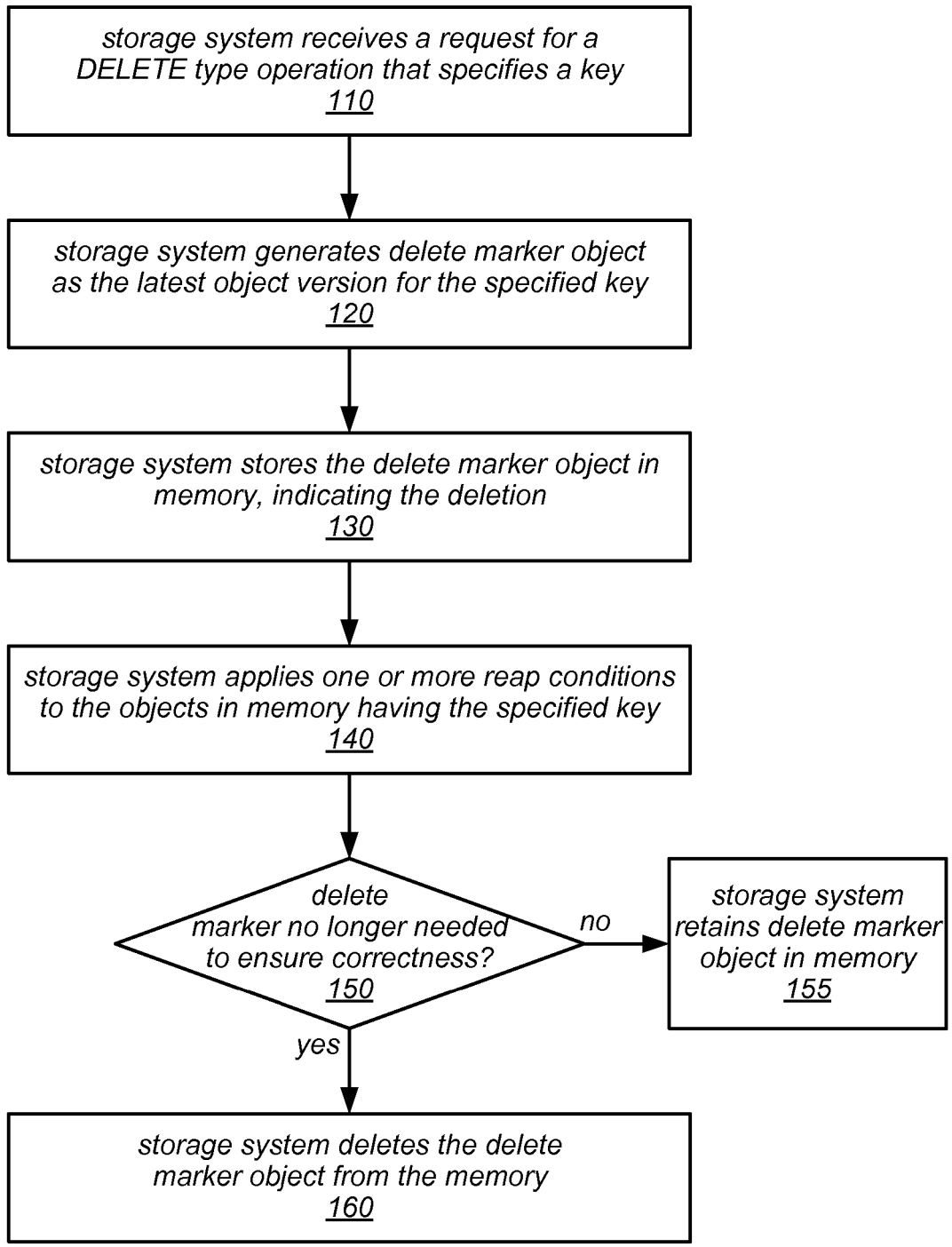
FIG. 1 is a flow diagram illustrating a method for creating, and subsequently removing, a delete marker object in a storage system that supports versioning, according to one embodiment.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

The systems and methods described herein for providing object versioning in a storage system may support the logical deletion of stored objects through the use of delete marker objects. For example, in response to a delete operation specifying a key, but not a version identifier, the storage system may create a delete marker object that is stored as the latest object version of the key. Like other types of tombstones, delete marker objects are stored in the system itself. Therefore, their presence may increase overhead costs to the system for supporting customers whose data includes these objects. In addition, it may be expensive and/or time consuming for some API implementations to deal with the presence of delete marker objects in the storage system, whether they acknowledge, ignore, or skip delete marker objects when generating and returning results. For at least these reasons, it may be beneficial to remove extraneous delete marker objects as soon as possible.

In some embodiments, the storage systems described herein may provide an automated process for deleting extraneous delete marker objects in an eventually consistent distributed storage system. Rather than employing a process for delete marker deletion involving a simple time-to-live (TTL) condition, these storage systems may provide mechanisms for determining which, if any, delete marker objects are no longer needed to ensure correct operation of the storage system by applying a set of conditions (referred to herein as "reap conditions") that are more complex than a standard TTL. A benefit of this approach may be a reduction in the average number of delete marker objects that are stored in the system. This may, in turn, result in reducing data storage requirements and other overhead costs, and increasing the performance of any API implementations that must deal with the presence of delete marker objects in the storage system.

In some embodiments, in response to performing a mutating operation that specifies a given key, the storage system may perform an analysis of the delete marker objects that are stored in the system and that include the given key (and/or metadata associated with those delete marker objects) to determine whether any of them are no longer needed to ensure correct operation of the system. In some embodiments, the analysis performed in response to a mutating operation may be applied to delete marker objects and/or metadata associated therewith that include one or more other keys (e.g., delete marker objects and/or metadata stored locally with delete marker objects and/or metadata that include the given key) in addition to, or instead of, to delete marker objects that include the given key. The analysis may apply one or more reap conditions to the delete marker objects and/or metadata to identify extraneous delete marker objects, and may remove them from storage.

In some embodiments, if at least one of the reap conditions is met (e.g., evaluates to "true") for a given delete marker object, it can safely be deleted. In various embodiments, the reap conditions may be evaluated locally (e.g., on a single computing node in a distributed storage system, or in a single data store instance, such as a "block" or "brick" described herein, or a replica of a "block" or "brick") and/or globally (e.g., with a view of all computing nodes and/or data store instances in a distributed storage system), as is appropriate. In many cases, reap conditions can and should be evaluated locally, because local reaping of delete marker objects may occur more quickly than global reaping, and may result in storing fewer delete marker objects in the system, on average. In other cases, however, one or more of the reap conditions cannot be evaluated locally, but instead require additional context in order to perform a comprehensive analysis. For example, if a particular reap condition requires that all versions of an object in all data store instances have the same value, then that reap condition cannot be evaluated locally and must be evaluated globally. In some embodiments, a local or global analysis may be performed periodically (e.g., at pre-determined time intervals) rather than in response to a mutating operation or other event in the storage system.

The following concepts and terms may be used herein to describe storage systems and mechanisms thereof that support data object versioning and/or automatic deletion of extraneous delete marker objects, according to various embodiments:

Bucket—A bucket is a logical container in which objects may be stored in a storage system on behalf of a user. In some embodiments, every object may be contained in a bucket, and every object may be addressable using a combination of a bucket identifier and one or more identifiers of the object itself Object—Objects are the fundamental entities stored in a storage system. In some embodiments, the stored objects may include object data and/or metadata. For example, each object may include a data object portion, and a metadata portion (which may include default metadata and/or versioning related metadata). As noted above, in some embodiments, an object may be uniquely identified within a bucket by the combination of a user key (e.g., an object name) and a version identifier (or version-id).

Key—A key is an identifier for an object within a bucket. In some embodiments, every object in a bucket may have exactly one key, and the combination of a bucket, key, and version identifier may uniquely identify each object stored in the storage system.

In various embodiments, the storage systems described herein may include support for any or all of the following storage related tasks:

Create buckets—create and name a bucket that stores data and/or metadata in objects.

Store data in buckets. In various embodiments, each object may be stored and retrieved using a unique key, which may be assigned by the developer of the data or owner of the bucket. For example, when writing an object to the storage system, a user may specify a unique key in the namespace of a bucket owned by the user.

Retrieve data—In various embodiments, a user may retrieve his or her data (i.e. to read and/or download the contents of the objects that he or she owns) and/or may enable others to retrieve that data.

Define permissions—In various embodiments, a bucket owner (and/or another privileged user who has the required permissions) may grant or deny access to others who want to upload data into or download data from a particular bucket.

Delete data—In some embodiments, a bucket owner (and/or another privileged user who has the required permissions) may delete some of the data stored in the bucket.

List stored objects—In various embodiments, a bucket owner (and/or another privileged user who has the required permissions) may request a list of some or all of the objects stored in the bucket.

As noted above, all objects stored in a given storage system may be uniquely identified by a key/version-id pair. In such embodiments, operations that retrieve data from objects, such as GET OBJECT, and COPY OBJECT operations defined by an Application Programming Interface (API), may accept an optional version-id input that identifies a particular version of an object from which to retrieve data. For each of these APIs, if a key is specified, but no version-id is specified, the system may be configured to automatically determine the version-id of the latest version of the object having the specified key, and to retrieve data from that version of the object (i.e. to automatically fill in the latest version-id for a specified key if no version-id is specified). In some embodiments, operations that create new objects, such as PUT OBJECT and COPY OBJECT operations defined by the API, may automatically generate a unique version-id (which may be a unique string) and assign it to the newly created object. In some embodiments, a version-id may be bound to an object for the lifetime of the object and can never be changed. In some embodiments, subsequent to the execution of a DELETE KEY operation that specifies a key (or a DELETE OBJECT operation that specifies a key, but not a version-id), attempts to retrieve an object having the specified key without specifying a version-id (e.g. using GET OBJECT or COPY OBJECT operations) may return an error indication. Note, however, that in this case, the storage system may not have actually deleted any data objects, or the contents thereof. In some embodiments, in order to permanently delete an object version, a DELETE type request (e.g., a DELETE VERSION operation) may need to specify both a key and a version-id.

Unlike in storage systems in which all objects are versioned or systems that do not support any object versioning, in some embodiments of the storage systems described herein, users may be able to turn object versioning on and/or off for a given bucket over time. In such embodiments, toggling the versioning state of a bucket may change the default behavior of delete and store type operations. For example, when versioning is toggled on, store and delete type operations may not overwrite an object nor actually delete the object. However, toggling versioning off may not imply that all versions of an object are removed in response to a delete type operation or overwritten in response to a store type operation. Instead, it may mean that the storage system stops automatically creating new versions in response to mutating operations, such as these.

The most common access pattern for a storage system may be a request to access the latest version of an object (i.e. the latest version of an object having a specific user key). The systems and methods described herein may in various embodiments provide "latest version" support without the need to explicitly generate symbolic links, and without relying on locking data objects and/or versions thereof. Because many object versions may exist in the storage system or a bucket thereof for a given key, the users may need to disambiguate which version that they want to get, copy, or delete by providing a specific version identifier for any accesses to that key. However, requiring this in all cases may complicate accesses to stored objects (e.g., accesses made via a web browser in a web-based storage service use-case). The systems described herein may provide latest version support by an extension of the underlying data structure in which data and metadata of various objects are stored and through the use of a FIND NEAREST operation defined by the API such that a version-id may not need to be specified for all accesses to objects stored in the system.

In some embodiments, the version-ids described herein may include sequencers with the property that the most significant bytes of the version-id (i.e. a sequencer portion) encode the time at which the version-id was generated. In one example, the sequencer may encode a value representing the difference between a predetermined time in the distance future and the time at which the sequencer (or version-id) was created. In some embodiments, the system may store objects that include a series of version-ids (or sequencers thereof) that has a total ordering across all sequencers. In such embodiments, the result of a comparison of the version-ids of the stored objects may be the same as the result of a comparison of the times at which the version-ids (or sequencers thereof) were created. In some such embodiments, a FIND NEAREST operation specifying a given user key, may return either the first key-value pair in the total ordering of key-value pairs that includes the given user key, or the next key-value pair in the total ordering of key-value pairs.

In some embodiments, a single Unicode data point (e.g., the null character or another pre-defined, reserved character) may be introduced into the version-id as a delimiter character to connect a user key with the sequencer. In such embodiments, sequences of <key, value> pairs (for which the key may be a composite key consisting of a user key, followed by a connector or delimiter character, followed by a version-id) may be stored within a data structure, e.g., in a key map, to reflect an overall ordering of objects in a particular bucket. Note that in some embodiments, the chosen delimiter character may not be allowed in a user-specified key, or in any user-specified portion of the composite key described above. However, in some such embodiments, this character may be used by the storage system for internal operations, as described herein. In some embodiments, the version-id for each explicit object version may include a sequencer portion and an ID portion, while the version-id for an implicit object version (e.g., one created while versioning was not enabled) may be a special sentinel value. In some embodiments, the ID portion of a version-id for an explicit object version may be generated by the system (e.g., randomly, or using another suitable approach), and may be unique to the target bucket and/or the namespace for the specified user key. In other embodiments, the ID portion may be assigned by a data owner or privileged user, and may be required to be unique to the target bucket and/or the namespace for the specified user key. In some embodiments, the ID portion may be a globally unique identifier (GUID). For example, in some embodiments, the composite key for an explicit object version may be of the form shown below, and the combination of the sequencer and the ID portion may be referred to collectively as the version-id for the explicit object version.

[bucket/user key] [version delimiter] [sequencer] [ID]

In one example, the version delimiter for a composite key may be a null character (e.g., 0x00), and the version-id may comprise 16 bits (e.g., 8 bits for the sequencer portion and 8 bits for the ID portion). Other numbers and combinations of delimiters (or delimiter bits), sequencers (or sequencer bits), and identifiers (or identifier bits) may be included in a composite key, in other embodiments. The use of the composite key described above, along with a FIND NEAREST operation, may in some embodiments provide a way for a storage system to automatically ascertain the version-id of (and to access) the latest object version for a key in constant time and without adding any additional indirection.

In some embodiments, the storage systems described herein may protect users from accidental overwrite, logical corruption, and unintended deletion, and may allow users to access a sequence of changes to the value (i.e. changes to the object data, or content) of an object over time. As previously noted, the combination of a key and a version-id may uniquely identify an object in a bucket. Objects in the same bucket that have the same key but different version-ids may be referred to as versions of one another, object versions of the key, or simply versions of the key. In some embodiments, the techniques described herein may enable multiple versions of an object to be stored in the same bucket. In various embodiments, the methods described herein may be employed in local or remote storage systems, including systems that provide storage services to users (e.g., subscribers) over the Internet. For example, the techniques described herein for providing object versioning and automatic deletion of extraneous delete marker objects may be implemented in various distributed storage systems, some of which may guarantee eventual consistency across multiple computing nodes and/or data store instances that make up the distributed storage system.

As described herein, a logical deletion of an object may be supported in the underlying data structure of the storage systems described herein by the inclusion of object versions called "delete marker objects", or simply "delete markers". For example, in some situations, a user may wish to block or limit access to some or all versions of a key without removing the key or its associated data from the storage system and/or bucket in which it is stored. In some embodiments, the systems described herein may create delete marker objects within the data structure to denote the logical deletion of the key. In such embodiments, the objects having the specified key may not actually be removed from the bucket in which they are stored, and may still be addressable and/or their contents may still be accessible (e.g., to the bucket owner and/or another privileged user).

As described herein, a delete marker object is a special type of object version that may have no data associated with it. In some embodiments, a delete marker object may be used to indicate that an object having the same user key as the delete marker has been logically deleted. For example, a delete marker object may be created by the storage system in response to a DELETE KEY operation that specifies a key (or a DELETE OBJECT operation that specifies a key, but not a version-id). This newly created delete marker may be the latest version of the key specified in the DELETE KEY (or DELETE OBJECT) operation. A delete marker may in some embodiments be used to support end-user logical deletion as well as undelete operations. In some embodiments, the use of delete marker objects in the underlying storage system for a storage service may protect users from many accidental deletion scenarios. In some embodiments, various API implementations treat delete marker objects differently that other objects stored in the system. For example, an API that lists all data elements (e.g., all active user keys) in a data store (e.g., a LIST BUCKET operation) may effectively ignore or skip any delete marker objects, since they represent a deletion in the storage system, rather than any active data stored in the system. In some cases, it may be expensive and/or time consuming for such API implementations to skip delete marker objects. Therefore, it may be beneficial to remove delete marker objects as soon as possible (e.g., as soon as they are no longer needed to ensure correct operation of the storage system).

Note that in some embodiments, multiple delete marker objects may be created for a given key. The existence of a large number of delete marker objects having a small number of keys may not affect the correctness of the responses of the system to operations targeting those keys, but may negatively impact costs incurred by the system and/or the performance of the system. In one example, a user may request that a series of operations be performed on a bucket, as follows:

The user issues 1,000,000 DELETE KEY operations specifying user key K1 in bucket B The user issues a PUT OBJECT operation specifying user key K2 in bucket B The user issues a LIST BUCKET operation for the contents of bucket B In the case described above, the result of a LIST BUCKET operation should contain only user key K2. However, 1,000,000 delete marker objects also exist in the keymap key space for bucket B. Skipping 1,000,000 delete marker objects may be prohibitively expensive in terms of computation resources, time, and/or input/output resources. In some cases, the amount of work needed to skip these extraneous delete marker objects (which may provide no useful information in the storage system) may actually result in an error, such as a user timeout (e.g., if the response to the LIST BUCKET operation cannot be returned within an expected maximum response time).

As previously noted, delete marker objects (like other types of tombstones) are objects to be stored, and therefore increase the costs to the system (e.g., in terms of the physical storage and/or other overhead costs) to support customers whose buckets contain these objects. For example, in some embodiments, a delete marker object (and its associated metadata) may be stored within the underlying storage structure such that it has the same size and impact on algorithmic running time as do objects representing active customer data. In embodiments in which the storage system provides storage of customer data through a storage service, while customer actions may create these delete marker objects, they may not pay for them to be stored and may not have permission to explicitly remove them themselves. While the use of delete marker objects for preventing accidental deletion may provide the best end-user experience (in terms of complexity and flexibility for the users), it may be up to the system itself to manage the costs associated with their use (such as by automatically removing delete marker objects in response to determining that they are no longer needed to ensure correctness).

As noted above, the techniques described herein may in various embodiments reduce the impact of delete marker objects in the system on algorithmic running time as well as storage overhead. While the former may largely impact performance from the perspective of storage system users (e.g., customers or subscribers), the latter may impacts the financial performance of the system from the perspective of the storage system provider. As described in more detail here, a delete marker cleanup mechanism may inspect sequences of keys only when other modifications have been made to the sequence. The sequence of keys may be ordered lexicographically and scanned in the same order to determine if any delete marker objects stored in the system are no longer valuable to the operation of the system.

As previously noted, each DELETE operation of a key (e.g., a user key) may result in creation of a delete marker object. A delete marker object is a persisted entity that represents the logical deletion of a user key. Various API implementations supported in the storage system described herein may be configured to handle these delete marker objects appropriately. For example, in some embodiments, a GET OBJECT API implementation may return an error indication (e.g., 404 Object Not Found) when the latest version of a user key is a delete marker object. Using the example described above, the existence of 1,000,000 delete marker objects in a bucket may in some cases (and in some embodiments) be semantically equivalent to their inexistence, such as when no other objects are stored in the storage system that have the same user key as these 1,000,000 delete marker objects. Therefore, in such cases, it may be safe to reap (i.e. to delete) all 1,000,000 delete marker objects, which may improve the performance and/or availability of the storage system.

In general, there may be four relevant cases to consider when determining whether one or more delete marker objects can be safely deleted in a storage system:

C1: No delete marker objects exist for a particular user key

C2: A delete marker object is the latest object version that have a particular user key C3: All object versions that have a particular user key are delete marker objects C4: A delete marker object is not the latest object version that has a particular user key In some embodiments, no delete marker objects can be deleted for a particular user key in cases C1 or C2. However, in some embodiments, cases C3 and C4 may be considered to be delete marker reap conditions, i.e. it may always be safe to delete any delete marker that meets one of these conditions. In other embodiments, there may be other conditions under which the storage system may automatically delete one or more delete marker objects (e.g., reap conditions specific to a particular storage system implementation, reap conditions specific to particular use models, or reap conditions specified by a user/subscriber to a storage system). For example, in one embodiment, delete markers may only be deleted when the immediately prior entry in the key map is not a delete marker entry for the same end-user key or the immediate successor entry corresponds to an object having a different user key. Note that although this analysis sounds like it may run in O(n) time (where n is the number of keys in the sequence), it may actually run in O(1) in practice, where it may be applied after all mutating operations, since at most three key map entries within the sequence must be inspected. In other embodiments, the storage system may not delete any delete marker objects until all versions of a key have been deleted (as in C3 above).

FIG. 1 is a flow diagram illustrating a method for creating, and subsequently removing, a delete marker object in a storage system that supports versioning (e.g., a storage system that provides a storage service), according to one embodiment. As illustrated at 110, the method may include the storage system receiving a request to perform a delete type operation that specifies a key (e.g., a user key). For example, a requester (e.g. a user, user application, or process) may initiate a delete type operation that specifies a user key, but that does not specify a version-id. In some embodiments, a requester may issue a DELETE KEY instruction to the shared storage system or storage service, and that DELETE KEY instruction may conform to an API similar to those described herein. The DELETE KEY instruction may be issued to request that a user key be deleted from a bucket that is owned by the requester (e.g., a bucket owned by a user who is a storage service subscriber), and/or that is currently being accessed. In some embodiments, in response to receiving the request (i.e. via the DELETE KEY instruction), the storage system may logically delete the specified key from the bucket, and may or may not actually delete a data object or its contents from the target bucket.

Note that in some embodiments, the method may include the storage system determining whether the requester has permission to delete objects that are stored in the target bucket, and if not, returning an indication of an error to the requester (not shown). As illustrated in this example (which assumes that the versioning state of the bucket is "enabled"), the method may include the storage system generating a new delete marker object (with a new, unique version-id) as the latest version for the specified key, as in 120. As described herein, in the case of a logical deletion, no actual object data is deleted. As illustrated at 130, in this example, in response to receiving the request to perform a DELETE type operation, the storage system may store the delete marker object in memory, indicating the deletion (e.g., indicating a logical deletion).

As illustrated in FIG. 1, at some point subsequent to creating and storing the delete marker object in memory, the storage system may apply one or more reap conditions to all or a subset of the objects in memory that have the specified key, as in 140. In some embodiments, the reap conditions may be usable to determine whether the delete marker is needed to ensure the correctness of storage system responses to operations targeting objects that have the specified key. In some embodiments, in response to determining that the delete marker is no longer needed to ensure correctness (e.g., if at least one of the reap conditions is met), the storage system may remove the delete marker object (e.g., deleting it from the memory in which it was stored). This is illustrated in FIG. 1 as the negative exit from element 150, and element 160. If, it is determined that the delete marker is still needed to ensure correctness (e.g., if none of the reap conditions is met), the storage system may retain the delete marker object in the memory in which it was stored. This is illustrated in FIG. 1 as the positive exit from element 150, and element 155.

The systems described herein may in some embodiments support multiple operations for listing the contents of a bucket. For example, one operation defined by the API (e.g., a LIST BUCKET operation) may be used to list only the versions of stored data objects that can be retrieved without specifying a version-id for the data objects. For example, such an API may cause the storage system to return a list identifying the latest version of each data object stored in the bucket unless the latest version of a data object is a delete marker. In this example, if the latest version of a data object were a delete marker, no data objects identified in the response would have the same user key as the delete marker.

In some embodiments, it may be inefficient (e.g., expensive and/or time consuming) to perform such a LIST BUCKET operation when a bucket includes one (or many) delete marker objects, since this operation may need to detect any delete marker objects and then determine whether and/or how their presence affects the results of the LIST BUCKET operation. In such embodiments, removing delete marker objects that are no longer needed to ensure correct operation of the storage system occasionally and/or on a periodic basis, may allow such a LIST BUCKET operation to be performed more efficiently (on average).

In some embodiments, another operation defined by the API (e.g., a LIST VERSIONS operation) may be used to list all of the versions of the data objects stored in a given bucket, rather than only the versions of stored data objects that can be retrieved without specifying a version-id for the data objects. For example, such an API may cause the storage system to return a list identifying every version of each data object stored in the bucket, including any versions of stored data objects that are delete marker objects. In this example, if one of the versions of a data object were a delete marker object, the delete marker object would be included in the data objects identified in the response. In some embodiments, using the example described above in which 1,000,000 delete marker objects having the same key are stored in a bucket, all 1,000,000 delete marker object may be identified on the list returned by this operation, which may be expensive in terms of computation resources, time, and/or input/output resources. Again, removing delete marker objects that are no longer needed to ensure correct operation of the storage system occasionally and/or on a periodic basis, may allow such a LIST VERSIONS operation to be performed more efficiently (on average). Note that in other embodiments, a LIST VERSIONS operation may be configured to return only the most recently stored delete marker object having a given key, or only the most recently stored delete marker object in a sequence of two or more consecutively stored delete marker objects having a given key. Since, in such embodiments, this operation may need to detect any sequences of multiple delete marker objects and then determine whether and/or how their presence affects the results of the LIST VERSIONS operation, removing delete marker objects that are no longer needed to ensure correct operation of the storage system occasionally and/or on a periodic basis, may allow such a LIST VERSIONS operation to be performed more efficiently (on average).

In some embodiments, a data structure (e.g., a key map) may store metadata about the objects contained in a storage system or in a bucket thereof. For example, in some embodiments, a key map for a particular bucket may include a collection of inodes, each of which represents an object stored in the bucket. Each inode may include metadata associated with the object it represents, and this metadata may indicate (e.g., directly or through any of various encoding schemes) a user key, version-id, and creation/modification date. The order of the inodes in a key map may reflect a total ordering for the objects in a bucket, e.g., based on the user keys and version-ids of the objects in the bucket. For example, in some embodiments, the inodes may be sorted first by user key (e.g., lexicographically), and then by version-id. In some such embodiments, the object versions returned by a LIST VERSIONS operation may be ordered first in ascending lexicographic order of their keys (e.g., in alphabetical order, A to Z), and then in descending order of their creation dates (i.e. with the latest version listed first). Several examples of key maps are illustrated in FIGS. 3A-3C, and described in more detail below. The use of key maps in determining the latest version of an object is also described in more detail below.

As noted above, both object versions containing active user data and object versions that are delete marker objects may be included in a list of objects returned to a requester by a LIST BUCKET operation, or similar. In some embodiments, each entry in the returned list of objects may include an indication of whether or not the corresponding object is the latest version of the objects stored in the system that have the same key.

It should be noted that a delete marker object is not to be confused with a keymap delete marker entry, which may represent an actual (as opposed to logical) deletion of a user key or object version. Entries representing a logical deletion of an object (e.g., an entry corresponding to a delete marker object) and entries representing an actual deletion of an object (regardless of whether the object deleted was a delete marker object or an explicitly specified object version) may be stored in the key map, and may include keys. In some embodiments, each of these keys may include keymap sequencers (such as those described herein), which represent the logical time of the creation of the keymap key. Keymap delete marker entries may be used by the storage system primarily to ensure that actual deletions are consistently eventually reconciled, whereas delete marker objects may be used to ensure that the system provides correct responses to operations following a logical deletion.

The systems and methods described herein for supporting object versioning may allow efficient logical deletion of a stored object, using the delete marker described above. In some embodiments, a DELETE KEY operation may behave differently from the DELETE VERSION API described herein, in that a version-id is not specified for a DELETE KEY operation. For example, if the versioning state of the targeted bucket is enabled when a DELETE KEY operation is issued, this API may cause the storage system to create a new delete marker as the latest object version for the specified user key, and may assign a unique version-id to the delete marker. As noted above, the delete marker may not store any object data (i.e. the contents of the delete marker object may be empty), but the delete marker object may include metadata, such as that described herein. In this example, subsequent attempts to retrieve an object having the specified key without specifying a version-id (e.g. using GET OBJECT, or COPY) may return an error indication (e.g., 404 Object Not Found, or similar). Note, however, that in this case, the storage system may not have actually deleted any data objects, or the contents thereof, and the data object versions previously stored in the bucket may be addressable (and/or their contents accessible) using retrieval operations that specify their version-ids. Note that in some embodiments, the requester may need to have permission to modify the contents of the target bucket and/or permission to delete objects (or objects with the specified user key) in the target bucket in order to perform a DELETE KEY operation.

As described above, in some embodiments, more than one delete marker object may be stored in the storage system (or in a bucket thereof) for a given key. For example, if a delete operation is requested for a given key after a delete marker has already been created for that key, another delete marker (with another unique version-id) may be created for that key. In such embodiments, two or more delete marker objects may be created back-to-back (i.e. as adjacent object versions in the sequential ordering of objects with the given key), or delete marker objects may be stored in the bucket in multiple arbitrary positions within the sequential ordering of objects with the given key. For example, if two delete operations specifying the same key are performed (and versioning is enabled) without performing any store operations specifying that key between them, two back-to-back delete marker objects may be created in the bucket. If one or more store operations for a given key are performed between two delete operations specifying that key (and versioning is enabled), the delete marker objects and newly stored object versions may be interspersed within the sequential ordering of objects with that key.

As previously noted, a different operation, e.g., a DELETE VERSION operation defined by the API, may in some embodiments be used to permanently delete a version of a stored data object. In such embodiments, this API may provide the only way to permanently delete object versions that are protected by versioning, while implicit objects (e.g., objects that were created when versioning was not enabled, and which may have a sentinel version-id value indicating such) may be overwritten and/or deleted in other ways. Since this API facilitates the irreversible, permanent deletion of data, it may be a privileged operation that can only be performed by the owner of the bucket containing the data object version targeted for deletion and/or by another privileged user to whom permission to permanently delete a version of a stored data object has been granted. For example, the requester may need to have permission to modify the contents of the target bucket, to have permission to delete the specified object version, and/or to be acting as the bucket owner or as a privileged user in order to perform a DELETE VERSION operation. Again note that this DELETE VERSION operation is different from the DELETE KEY operation described above in that a version-id must be specified for the DELETE VERSION operation.

Figure 2A:
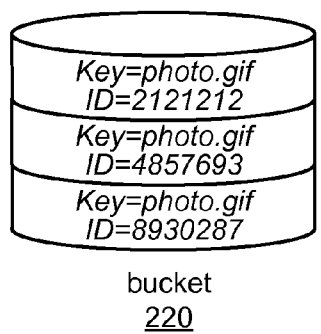
FIGS. 2A-2C illustrate the effects of a logical delete operation on a bucket in a storage system that supports versioning, according to one embodiment.
Figure 2B:
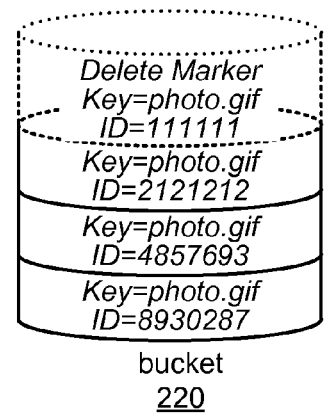
Figure 2C:
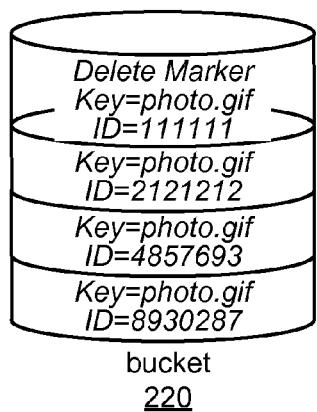

FIGS. 2A-2C illustrate the effects of a logical delete operation on a bucket in a storage system that supports versioning, according to one embodiment. As previously noted, in some embodiments, when an object is stored in a versioning-enabled bucket, any old versions of that object that are already stored in the bucket may not be overwritten. Instead, a new version of the object may be added to the bucket. FIG. 2 illustrates a versioning-enabled bucket 220 into which three objects with the same name (i.e. with the same user key, "photo.gif") have been PUT (e.g., using three different PUT type operations, such as PUT or COPY). In this example, the oldest object version stored in the bucket is the object having the version-id value shown as ID=8930287; the next object version stored in the bucket is the object having the version-id value shown as ID=4857693; and the most recently stored object version is the object having the version-id value shown as ID=2121212). Note that functionality for generating new version identifiers for objects when they are stored in the system may prevent users from accidentally overwriting or deleting objects, and may also provide users the opportunity to retrieve previous versions of an object.

In some embodiments, when a user key is deleted from a versioning-enabled bucket (i.e. using a DELETE KEY operation), all versions of the object may remain in the bucket, and a delete marker object may be inserted in the bucket. This is illustrated in FIGS. 2A-2B. For example, FIG. 2A illustrates a DELETE KEY operation targeting an object stored in versioning-enabled bucket 220 that has a user key "photo.gif". In this example, since the DELETE KEY operation does not specify a version-id for the object to be deleted, no objects are actually deleted from bucket 220. Instead, in response to the DELETE KEY operation, the system generates a new version-d value (shown as ID=111111), and inserts a new delete marker object having that version-id in bucket 220. The result of this DELETE KEY operation is illustrated in FIG. 2B, which depicts bucket 220 storing all three of the previous versions of the object "photo.gif" and the newly added delete marker for the "photo.gif" user key. As illustrated in this example, the delete marker itself becomes the latest version of the data object.

As previously noted, in some embodiments, by default, a GET OBJECT operation may retrieve and return the latest version (i.e. the most recently stored version) of an object having a specified user key. In such embodiments, in response to a GET OBJECT operation specifying a user key but not a version-id, the storage system may return an error indication if the latest version of the object is a delete marker. This is illustrated in FIG. 2C. In this example, a GET OBJECT operation targeting versioning-enabled bucket 220 and specifying a user key "photo.gif" returns a "404 Object Not Found" error indication, since the latest version of an object having the key "photo.gif" is a delete marker. In this example, there is no change in the contents of bucket 220 as a result of this GET OBJECT operation.

Note that in some embodiments, even if the latest version of an object is a delete marker object, an older version of that object may be retrieved using a GET OBJECT operation that specifies the version-id of the older version. In some embodiments, in response to a GET OBJECT operation that specifies a user key "photo.gif", and a version-id of 8930287, 4857693, or 2121212, the storage system may return that object version even if it is not the latest version of that object, and even if the latest version of that object (or any more recent version of that object) is a delete marker object. Note that, as in the previous example, there may be no change in the contents of bucket 220 as a result of such a GET OBJECT operation. In some embodiments, in response to a GET OBJECT operation that specifies a user key "photo.gif", and a version-id of 111111 (which represents the delete marker object), the system may return an error. In other embodiments, if a GET OBJECT operation that specifies a user key "photo.gif", and a version-id of 111111 is issued by the bucket owner or another privileged user, the storage system may return an indication that the object version exists, and that it is a delete marker object.

As previously noted, in some embodiments, a stored data object may be permanently deleted using a delete type operation that specifies the particular version to be deleted. For example, in some embodiments, in response to a DELETE VERSION operation that specifies a user key "photo.gif", and a version-id of 8930287, 4857693, 2121212, or 111111, the storage system may permanently delete the corresponding object version whether or not it is the latest version of that object, and whether or not the latest version of that object (or any more recent version of that object) is a delete marker object. In some such embodiments, only a user with special privileges (e.g., the owner of the bucket, or another user to whom permission to permanently delete objects in the bucket has been granted) may be able to permanently delete a version of an object stored in the bucket.

FIGS. 3A-3C illustrate examples of the ordering of the elements (e.g., inodes) in a key map, according to one embodiment. In these examples, key map 300 reflects the contents of a bucket that includes objects having user keys of A, B, and C. FIG. 3A illustrates the contents of key map 300 after three explicit versions of each of these objects have been stored in the bucket (while versioning was enabled for the bucket). In this example, the version-id values associated with these objects (each of which may comprise a sequencer value and a unique identifier, in some embodiments) have been simplified for illustration purposes, and are shown as single-digit version-id values.

As described herein, in some embodiments, the elements in a key map for a given bucket may be sorted first by user key (lexicographically), and then by their version-id values. In embodiments in which the version-id values for each explicitly created object version includes a sequencer portion based on the creation date of the object, sorting key map elements for explicit object versions by their version-id values effectively places them in order of the creation dates of those objects (i.e. in reverse chronological order, such that the elements associated with the most recently stored object versions appear first in the key map). This sorting scheme is illustrated in FIG. 3A, in which the three versions of an object having user key A are sorted in reverse order by version-id, and are followed by the three versions of an object having user key B (again sorted in reverse order by version-id), and finally the three versions of an object having user key C (sorted in reverse order by version-id). In other words, in this example, version-id values assigned to object versions decrease over time, such that the entry with the largest version-id value for a given user key represents the oldest object version for the given user key that is stored in the system, and the entry with the smallest version-id value for a given user key represents the most recently stored object version for the given user key in the system.

As described herein, a FIND NEAREST type operation may in some embodiments be invoked by the storage system to determine the latest version of an object with a given key, when no version-id is specified for an operation specifying the given key. In some embodiments, this FIND NEAREST operation may search the key map for the target bucket to locate the first key map element (e.g., inode) having the specified user key. If all of the elements in the key map having the specified key are associated with explicit object versions, the first element in the key map having the specified key may represent the latest object version with the specified key. Thus, in the example illustrated in FIG. 3A, a GET OBJECT operation on user key A would return the data of the object represented by the first element of the key map (A#2), which is an object having user key A and a version-id value of 2, since this is the latest object version with user key A. Similarly, a GET OBJECT operation on user key B would return the data of the object represented by the fourth element of the key map (B#3), since this is the latest object version with user key B, and a GET OBJECT operation on user key C would return the data of the object represented by the seventh element of the key map (C#2), since this is the latest object version with user key C. In this example, it is assumed that none of the entries illustrated in FIG. 3A as being present in key map 300 are delete marker objects.

FIG. 3B illustrates the contents of key map 300 after a delete marker object having user key B is stored in the bucket associated with key map 300. In this example, the newly stored delete marker object is an explicit object version with user key B and a newly generated version-id value (2). As illustrated in this example, a new entry (shown as element 310 in FIG. 3B) is added to key map 300 between the last element representing objects having the user key A (i.e. the element representing the oldest stored object version with user key A) and the first element representing a previously stored version of the object having user key B (i.e. the element representing the most recently stored version of the object prior to storing the delete marker object). In this example, the new element, shown in the fourth position in key map 300, reflects a user key of B, and a simplified version-id value of 2, although the version-id value may in some embodiments comprise a sequencer value and a unique identifier.

In the example illustrated in FIG. 3B, a GET OBJECT operation specifying user key B, but not specifying a version-id, may return an error message (e.g., 404 Object Not Found). This is because a FIND NEAREST operation specifying user key B may correctly identify element 310 in key map 300 as the one representing the latest object version with user key B, and element 310 represents a delete marker object, indicating a logical deletion of user key B. Note that the results of a GET OBJECT operation that specifies user key A or user key C would be no different than in the example illustrated in FIG. 3A. Since the delete marker object corresponding to entry 310 in key map 300 represents the latest object version having user key B, and because other object versions having user key B are also stored in the storage system, this delete maker object does not meet any of the reap conditions described above. In other words, until or unless a change in the bucket contents causes one or more reap conditions to be met for this delete marker object, it may be needed to ensure correct operation of the system in response to operations specifying user key B, and cannot yet be deleted.

FIG. 3C illustrates the contents of key map 300 after another object version having user key B (i.e. an object version having user key B that is not a delete marker object) is stored in the bucket associated with key map 300. In this example, the newly stored object is an explicit object version with user key B and a newly generated version-id value (1). As illustrated in this example, a new entry (shown as element 320 in FIG. 3B) is added to key map 300 between the last element representing objects having the user key A (i.e. the element representing the oldest stored object version with user key A) and the first element representing the most recently stored version of the object having user key B (i.e. element 310, which represents the delete marker object). In this example, the new element 320, shown in FIG. 3C at the fourth position in key map 300, reflects a user key of B, and a simplified version-id value of 1, although the version-id value may in some embodiments comprise a sequencer value and a unique identifier.

In the example illustrated in FIG. 3C, in response to receiving a GET OBJECT operation specifying user key B, but not specifying a version-id, the storage system may invoke a FIND NEAREST operation to determine the latest object version with user key B. In this case, the GET OBJECT operation may return the data of the object represented element 320 of the key map (B#1), since this is now the latest object version with user key B. Note that because an additional object having user key B has been stored in the storage system, the delete marker object represented by entry 310 in key map 300 is no longer the latest version of the stored objects that have user key B. In this case, the delete marker object meets one of the reap conditions described above, and is no longer needed to ensure correct operation of the storage system. Therefore, in some embodiments, this delete marker object can be safely deleted. Again note that in some embodiments deleting the delete marker object corresponding to entry 310 in key map 300 does not cause entry 310 to be deleted. Instead, it may be replaced by a keymap delete marker entry, which may be subsequently removed (once it is no longer needed to ensure eventual consistency, as described in more detail below).

In some embodiments, an element representing an implicit object version for a given key (one that was stored when versioning was not enabled) may always appear first in the key map (e.g., because the elements are sorted by their version-ids, and the sentinel value assigned to implicit object versions may be less than all other assigned ID values), but this implicit object version may not contain the most recently stored data for the given key. Instead, the second element with the given key (i.e. an element representing the most recently stored explicit object version with the given key) may represent the object version that contains the most recently stored data for the given key. Therefore, in some embodiments that store both implicit and explicit object versions, the FIND NEAREST operation described herein may need to examine the creation/modification dates of the key map entries associated with the implicit object version and an adjacent element associated with an explicit object version in order to determine which is the latest object version for the given key.

In some embodiments, the storage systems described herein may provide the operations described above using standards-based Representational State Transfer (REST) and/or Simple Object Access Protocol (SOAP) interfaces designed to work with a variety of applications, development tools, and/or Internet-development toolkits. These interfaces are similar, but there are some differences. For example, in the REST interface, metadata is returned in HTTP headers. If the storage system only supports HTTP requests of up to a given size (e.g., 4 KB, not including the body), the amount of metadata that may be associated with a stored object may be restricted. Using REST, standard HTTP requests may be issued to create, fetch, and delete buckets and/or objects thereof. In various embodiments, a user may employ a toolkit that supports HTTP in order to use the REST API, or may use a browser to fetch objects, as long as they are anonymously readable. A REST API may use standard HTTP headers and status codes, so that standard browsers and toolkits work as expected. In some embodiments, functionality may be added to HTTP (for example, headers may be added to support access control). In such embodiments, the functionality may be added such that it matches the style of standard HTTP usage. In some embodiments, a SOAP API may provide a SOAP interface (e.g., a SOAP 1.1 interface) using document literal encoding. As with the REST interface, users may employ a SOAP toolkit to create bindings, and then may write code that uses these bindings to communicate with the storage system.

An example of an API that provides access operations in an online or remote storage system that supports object versioning and deletion of extraneous delete marker objects is described below, according to one embodiment. In this example, a PUT or PUT OBJECT operation may specify any or all of the following information for the request, some of which may be input by a user, and some of which may be generated and/or attached to the request by a client or host process: a user key, a bucket identifier, a user/subscriber identifier, an authorization code, a date and/or time stamp reflecting the date/time of the request, the content type, and/or the content size of the data object (e.g., the number of bytes of content stored in the data object). In response, the storage system may return any or all of the following: a status indicator reflecting the success or failure of the operation, an identifier of the request, an internal identifier assigned to the newly stored data object, the version-id assigned by the storage system to the data object, a date and/or time stamp reflecting the date/time at which the data object was stored (e.g., the date/time at which the operation was completed), and/or an identifier of a server on which the data object was stored. In other embodiments, information other that than described above may be included in a PUT or PUT OBJECT request or response.

In this example, a GET OBJECT operation may specify any or all of the following information for the request, some of which may be input by a user, and some of which may be generated and/or attached to the request by a client or host process: a user key, a version-id, a bucket identifier, a user/subscriber identifier, an authorization code, and/or a date or time stamp reflecting the date/time of the request. In response, the storage system may return any or all of the following, in addition to the requested object data: a status indicator reflecting the success or failure of the operation, an internal identifier of the object, an identifier of the request, the version-id of the data object returned in response to the request, a date and/or time stamp reflecting the date/time at which the data object was stored (e.g., the date/time at which the operation was completed), a date and/or time stamp reflecting the last time the returned data object was modified, the content size of the returned data object (e.g., in bytes), the content type of the returned data object, and/or an identifier of a server from which the data object was retrieved. In other embodiments, information other that than described above may be included in a GET OBJECT request or response.

In this example, a COPY OBJECT operation may specify any or all of the following information for the request, some of which may be input by a user, and some of which may be generated and/or attached to the request by a client or host process: a source user key, a version-id, a source bucket identifier, a destination bucket identifier, a destination user key, a user/subscriber identifier, an authorization code, and/or a date or time stamp reflecting the date/time of the request. In response, the storage system may return any or all of the following: a status indicator reflecting the success or failure of the operation, an internal identifier of the source data object, an internal identifier of the copy of the data object, an identifier of the request, the version-id of the source data object (i.e. the version-id of a specified source data object, or of the latest version of a data object, if no version-id was specified), the version-id assigned to the newly created copy of the data object, a date and/or time stamp reflecting the date/time at which the copy of the data object was stored (e.g., the date/time at which the operation was completed), a date and/or time stamp reflecting the last time the data object was modified (which may be the same as the date and/or time stamp reflection the time at which the COPY OBJECT operation was completed), the content size of the copied data object (e.g., in bytes), the content type of the copied data object, an identifier of a server from which the data object was retrieved, and/or an identifier of a server on which the copy of the data object was stored. In other embodiments, information other that than described above may be included in a COPY OBJECT request or response.

In this example, a LIST BUCKET operation may specify any or all of the following information for the request, some of which may be input by a user, and some of which may be generated and/or attached to the request by a client or host process: a bucket identifier, a user/subscriber identifier, an authorization code, a maximum number of user keys for which data should be included in the response, a prefix and/or a delimiter that may be used to filter the results of the operation, and/or a date or time stamp reflecting the date/time of the request. In various embodiments, this API may behave the same irrespective of the current versioning state of the target bucket. In some embodiments, the requester may need to have permission to view and/or retrieve objects in the target bucket in order to perform this operation.

In response to a LIST BUCKET operation, the storage system may return any or all of the following: a status indicator reflecting the success or failure of the operation, an identifier of the request, the bucket identifier, a date and/or time stamp reflecting the date/time at which the list of data object versions was retrieved (e.g., the date/time at which the operation was completed), a maximum number of user keys for which data should be included in the response, an indication of whether the returned list has been truncated (e.g., based on a specified maximum number of user keys), a prefix and/or a delimiter that was used to filter the results of the operation, and a list of the data object versions stored in the bucket that are accessible without specifying a version-id. In this example, each of the elements of the list of data object versions may include any or all of the following: an internal identifier of the object, the version-id of the listed version of the data object, a date and/or time stamp reflecting the last time the listed version of the data object was modified, the content size of the listed version of the data object (e.g., in bytes), the content type of the listed data object, an identifier of the server on which the listed data object is stored, and/or an identifier or display name of the owner of the listed data object. In other embodiments, information other that than described above may be included in a LIST BUCKET request or response.

In this example, a LIST VERSIONS operation may specify any or all of the following information for the request, some of which may be input by a user, and some of which may be generated and/or attached to the request by a client or host process: a bucket identifier, a user/subscriber identifier, an authorization code, a maximum number of user keys for which data should be included in the response, a prefix and/or a delimiter that may be used to filter the results of the operation, a key marker and/or version-id marker (such as those described above) specifying a point at which a search for results should begin, and/or a date or time stamp reflecting the date/time of the request. In other embodiments, this API may behave the same irrespective of the current versioning state of the target bucket. In some embodiments, the requester may need to have permission to view and/or retrieve object versions in the target bucket in order to perform this operation.

In response to a LIST VERSIONS operation, the storage system may return any or all of the following: a status indicator reflecting the success or failure of the operation, an identifier of the request, the bucket identifier, a date and/or time stamp reflecting the date/time at which the list of data object versions was retrieved (e.g., the date/time at which the operation was completed), a maximum number of user keys for which data should be included in the response, an indication of whether the returned list has been truncated (e.g., based on a specified maximum number of user keys), a prefix and/or a delimiter that was used to filter the results of the operation, and a list of the data object versions stored in the bucket that are accessible without specifying a version-id. In this example, each of the elements of the list of data object versions may include any or all of the following: an internal identifier of the object, the version-id of the listed version of the data object, a date and/or time stamp reflecting the last time the listed version of the data object was modified, the content size of the listed version of the data object (e.g., in bytes), the content type of the listed data object, an identifier of the server on which the listed data object is stored, an identifier and/or display name of the owner of the listed data object, an indication of whether the data object version is the latest version of the stored data objects having the same user key, an indication of whether the data object version is a delete marker, and/or an identifier of a storage class. In other embodiments, information other that than described above may be included in a LIST VERSIONS request or response.

In this example, a DELETE KEY operation may specify any or all of the following information for the request, some of which may be input by a user, and some of which may be generated and/or attached to the request by a client or host process: a user key, a bucket identifier, a user/subscriber identifier, an authorization code, a content type, and/or a date or time stamp reflecting the date/time of the request. In response, the storage system may return any or all of the following: a status indicator reflecting the success or failure of the operation (e.g., a "204 No Content" indication may be returned if the delete operation is successful), an identifier of the request, the version-id assigned to the delete marker created in response to the request, an internal identifier of the delete marker, a date and/or time stamp reflecting the date/time at which the delete marker was stored (e.g., the date/time at which the operation was completed), the content size of the delete marker (e.g., zero), and/or an identifier of a server on which the delete marker was stored. In other embodiments, information other that than described above may be included in a DELETE KEY request or response.

In this example, a DELETE VERSION operation may specify any or all of the following information for the request, some of which may be input by a user, and some of which may be generated and/or attached to the request by a client or host process: a user key, a version-id, a bucket identifier, a user/subscriber identifier, an authorization code, a content type, and/or a date or time stamp reflecting the date/time of the request. In response to a DELETE VERSION request, the storage system may return any or all of the following: a status indicator reflecting the success or failure of the operation (e.g., a "204 No Content" indication may be returned if the delete operation is successful), an identifier of the request, the version-id of the deleted object, a date and/or time stamp reflecting the date/time at which the object was deleted (e.g., the date/time at which the operation was completed), the content size of the object following deletion (e.g., zero), an indication of whether the deleted object was a delete marker, and/or an identifier of a server from which the object was deleted. In other embodiments, information other that than described above may be included in a DELETE VERSION request or response.

Note that the API may in various embodiments include other operations not described above. Note also that in some embodiments of the APIs described herein, various pairs of operations may be initiated by a user/requester using the same API, but the requester may specify a different number of input parameter values for the two operations (e.g., the requester may specify an additional version-id value for one operation in the pair). In such embodiments, PUT, GET, COPY, and DELETE type operations may be invoked by a requester without the requester being aware of (or needing to know) the versioning state of the target bucket in the storage system. In such embodiments, a privileged user may initiate version-specific operations (e.g. for GET, COPY, and/or DELETE type operations) using these same APIs by specifying an additional input (i.e. a version-id value) in the operation call. In other embodiments, different APIs may be defined for two similar operations, one of which expects a version-id value to be specified, and one of which does not include (or expect) a version-id value to be specified.

For various reasons, including those described herein, it may be beneficial for a storage system to automatically delete any extraneous delete marker objects stored in the storage system (or in a bucket thereof). One embodiment of a method for determining which, if any, delete marker objects stored in a storage system (or a bucket thereof) can be deleted is illustrated by the flow diagram in FIG. 4. As illustrated in this example, the method may include beginning a reap analysis for delete marker objects having a specified key (e.g., a specified user key), as in 410. As illustrated in this example, and described herein, if all of the objects stored in the storage system (or bucket) that have the specified user key are delete marker objects, shown as the positive exit from 420, the method may include the storage system deleting all of the delete marker objects having the specified key, as in 425. In this case, it may be safe to delete all of the delete marker objects because they may not be needed to ensure the correct operation of the storage system in response to operations that specify the key. For example, a GET OBJECT operation that specifies a given key, but does not specify a version-id, would return an error (e.g., 404 Object Not Found) if the latest version of the stored objects having the specified key were a delete marker (which would be the case if all of the stored objects having the specified key were delete marker objects) or if no object versions having the specified key were stored in the system or bucket (which would be the case if all of the delete marker objects are deleted).

As illustrated in this example, if not all of the object versions stored in the storage system (or bucket) that have the specified user key are delete marker objects, shown as the negative exit from 420, but a particular delete marker object having the specified key is not the latest object version having the specified key (shown as the positive exit from 430), the method may include the storage system deleting the particular delete marker object, as in 440. Again, it may be safe to delete the particular delete marker object because it may not be needed to ensure the correct operation of the storage system in response to operations that specify the key. For example, a GET OBJECT operation that specifies a given key, but does not specify a version-id, would return the value of the most recently stored object version having the specified key (which is not the particular delete marker object), regardless of whether the delete marker object is retained in the storage system or is deleted.

On the other hand, if not all of the object versions stored in the storage system (or bucket) that have the specified user key are delete marker objects, shown as the negative exit from 420, but a particular delete marker object having the specified key is the latest object version having the specified key (shown as the negative exit from 430), the storage system may not be able to reap this delete marker object. In this case, the presence of the delete marker object (and/or a corresponding entry in a key map) may be needed to ensure the correct operation of the storage system in response to operations that specify the key. For example, a GET OBJECT operation that specifies a given key, but does not specify a version-id, should return an error condition (e.g., 404 Object Not Found), since the delete marker object is the latest object version having the specified user key. However, if the delete marker object is prematurely reaped (i.e. if it is deleted from the storage system memory before meeting a reap condition indicating that it is safe to do so), a GET OBJECT operation that specifies a given key, but does not specify a version-id, may mistakenly return the data of a different object version having the specified key (i.e. an object version that is not the latest object version having the specified user key).

Figure 4:
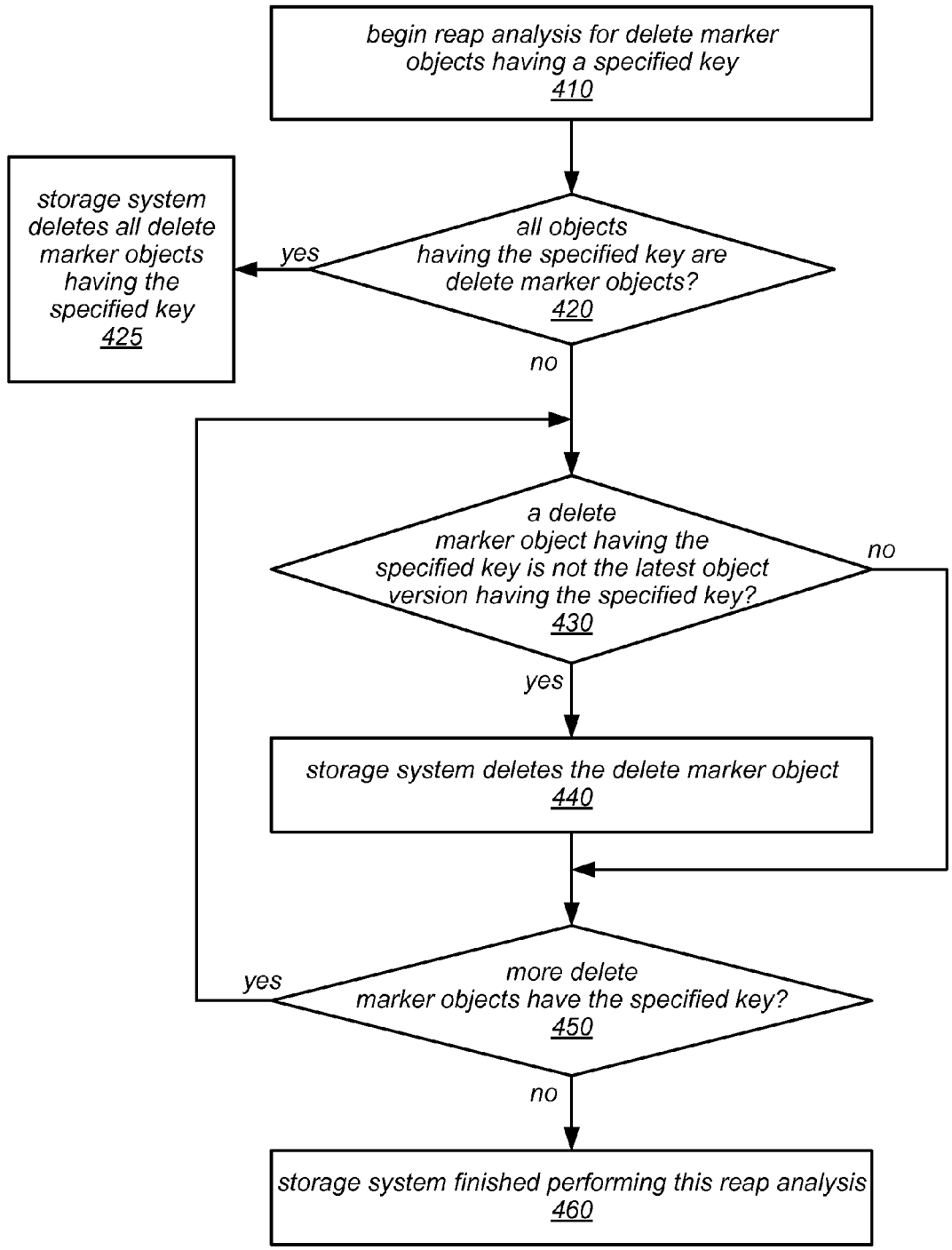
FIG. 4 is a flow diagram illustrating a method for determining which, if any, delete marker objects stored in a storage system can be deleted, according to one embodiment.

As illustrated in FIG. 4, various reap conditions (such as reap conditions C3 and C4 described above, which are evaluated in this example) may be applied to all of the delete marker objects in the storage system (or a bucket thereof) that have the specified key to determine which, if any may be deleted from the storage system memory. This is illustrated in FIG. 4 by the feedback from the positive exit from 450 to element 430. In this example, once the reap conditions have been applied to all of the delete marker objects in the storage system (or a bucket thereof) that have the specified key, shown as the negative exit from 450, the storage system may be finished performing this particular reap analysis, as in 460.

Note that in the example illustrated in FIG. 4 and described above, it is assumed that all of the data and/or metadata needed to perform a comprehensive reap analysis for all objects with a given key (e.g., the object versions themselves, and/or associated keys, version-ids, sequencers, or time stamps) is available locally. However, as describe in more detail below, in a distributed storage system, this may not always be the case. For example, in some embodiments, various object versions having a given key (and/or metadata associated with those object versions) may be stored on different computing nodes and/or in different data store instances (e.g., in different blocks, bricks, or any meaningful or arbitrary subset of the available storage) in the distributed storage system. In addition, one or more replicas of various data objects and/or associated metadata may be stored on different computing nodes and/or in different data store instances in the distributed storage system.

In various embodiments, the storage systems described herein may apply one or more reap conditions to metadata stored in objects themselves, or in metadata associated with those objects, but stored elsewhere in the system (e.g., in a key map). For example, in one embodiment, reap conditions may be evaluated locally on information stored in a component of a keymap subsystem that is the authoritative store for keymap keys (sometimes referred to as the "brick manager"). Within a keymap subsystem, subsets of the keymap data may be encapsulated in units called "blocks" or "bricks". In some embodiments, the storage system may apply various reap conditions to the information stored on a respective block when performing mutating operation (i.e. one that results in a change in one or more stored objects, and thus may change the keymap data associated with those objects). For example, after performing a mutating operation (e.g., a PUT, WRITE, or DELETE type operation), but before flushing a mutated block to disk, the storage system may automatically evaluate various reap conditions (e.g., conditions C3 and C4 described above), and may delete any delete marker objects that are determined to be extraneous (e.g., any delete marker objects for which at least one of the applied reap conditions is met).

As described herein, a delete marker analysis performed in response to a mutating operation may in some embodiments be applied to delete marker objects having the key specified for the mutating operation and/or to delete marker objects having one or more other keys (e.g., delete maker objects having other keys and/or metadata associated with delete marker objects having other keys that are stored in the same block as one or more objects having the key specified for the mutating operation). For example, in response to a mutating operation, the storage system may load a block that stores keymap data for the object targeted by the mutating operation. The storage system may apply one or more reap conditions (e.g., conditions C3 and C4 described above) to any or all delete marker objects represented by the keymap data stored in that block, regardless of the keys associated with those delete marker objects, and may delete any or all delete marker objects that are determined to be extraneous, based on that local analysis. Note that in some cases, the mutating operation that triggered the analysis may not produce a change in any delete marker objects, or in their status as a latest version of an object. In fact, in some cases, there may not be any delete marker objects represented in the keymap data stored in the block that have the key specified for the mutating operation (e.g., if the mutating operation creates or modifies, but does not delete, an object version). In this case, any analysis of delete marker objects applied in response to the mutating operation may be applied only to delete marker objects having keys other than the key specified for the mutating operation.

In some embodiments, the storage system may replace the key map entry for each reapable delete marker object with an appropriate delete marker entry (which may be referred to herein as a "keymap delete marker entry") in the key map, and the keymap sequencer of the replacement key map entry may be a newly minted keymap sequencer. In such embodiments, this sequencer selection may ensure that delete marker reaping is compatible with eventually consistent anti-entropy protocols that are employed in the system (i.e. those based on propagation of keymap information between key map instances on different computing nodes and/or in different data store instances). In other embodiments, if a delete marker object is determined to be extraneous (e.g., through a reap analysis such as any of those described herein) and is removed, the corresponding key map entry for the reapable delete marker object may be removed from the key map (rather than being replaced with a keymap delete marker entry in the key map).

In some embodiments, and in some situations, it may not be possible to evaluate particular reap conditions (e.g., conditions C3 or C4 above) locally (i.e. at the brick manager) within the context of a single block. For example, if the keymap information for all versions of a user key (which may include one or more delete marker objects) spans multiple blocks, it would be impossible to evaluate C3 when the only given context is a single block context. In this case, it may be prohibitively expensive and/or time consuming to search through an arbitrary number of blocks to evaluate condition C3 as part of a delete marker reap analysis performed in response to a mutating operation (e.g., prior to flushing the results of the mutating operation). Therefore, in some embodiments, the storage system may not to try to locally evaluate conditions C3 or C4 when the block context does not provide enough information to do so. In such embodiments, the storage system may rely on the performance of a global evaluation of conditions C3 and C4 to identify any reapable delete marker objects that a local evaluation would miss. In some embodiments, one or more reap conditions may be applied locally, and then a subsequent global evaluation may be performed to identify any reapable delete marker objects that the local evaluation may have missed.

Figure 5:
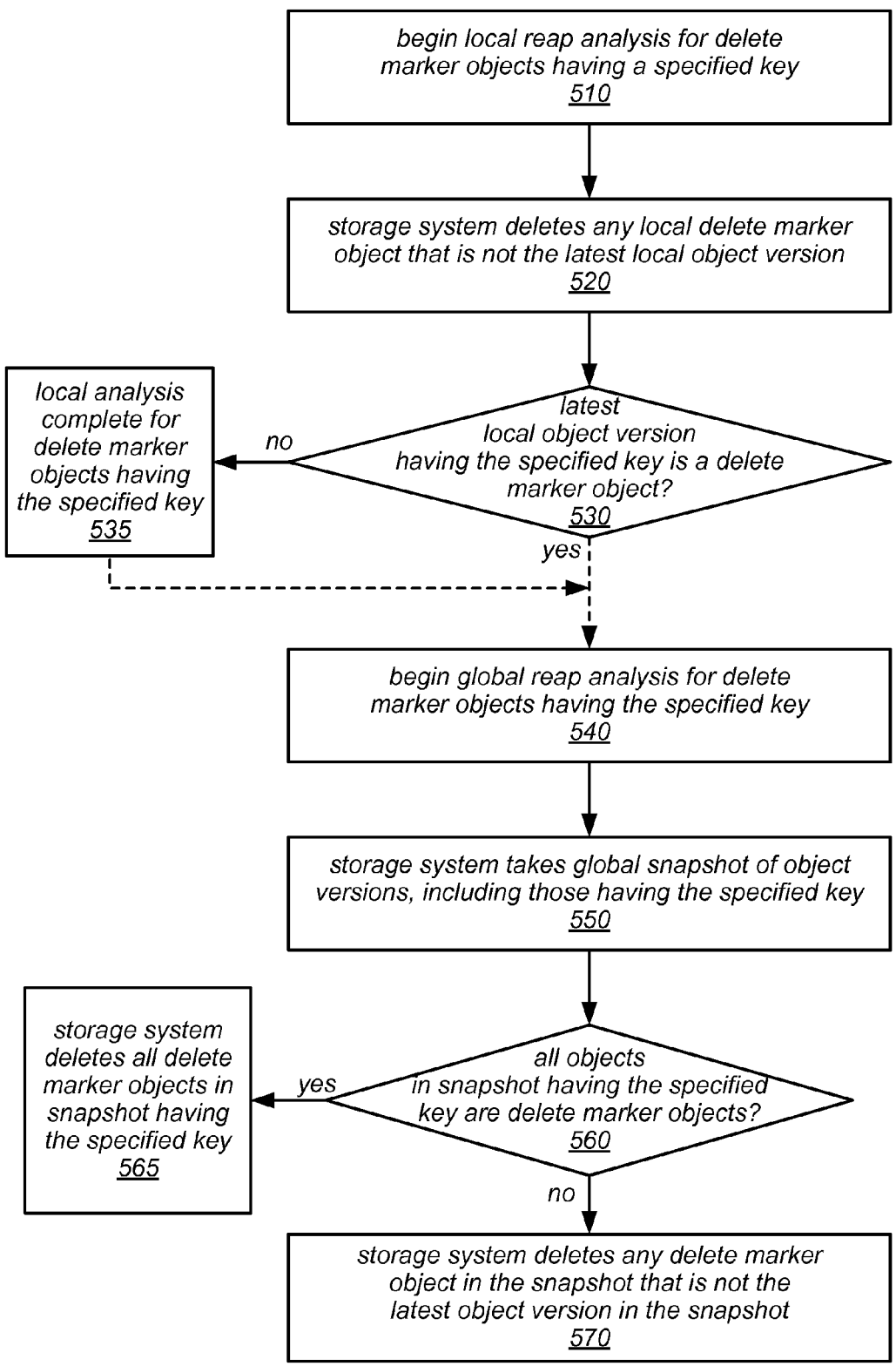
FIG. 5 is a flow diagram illustrating a method for performing local and/or global reap analyses for determining which, if any, delete marker objects stored in a distributed storage system can be deleted, according to one embodiment.

One embodiment of a method for performing local and/or global processes for determining which, if any, delete marker objects stored in a distributed storage system can be deleted is illustrated by the flow diagram in FIG. 5. Note that the method illustrated in this example makes no assumptions about whether object versions having the same key (and/or metadata associated with those object versions) are stored on a single computing node (or data store instance) or span multiple nodes (and/or data store instances). As illustrated in this example, the method may include the storage system beginning a local reap analysis (e.g., on one of a plurality of computing nodes of the storage system) for delete marker objects having a specified key (e.g., a specified user key), as in 510. The local reap analysis may include the storage system evaluating one or more reap conditions that can be at least partially applied locally. For example, the method may include the storage system deleting any local delete marker object having the specified key that is not the latest object version stored locally (e.g., on the computing node on which the local reap analysis is being performed, or in the same block or brick) that has the specified key, as in 520. In this case, it may be safe to delete one or more such delete marker objects because none of them can be the latest object version having the specified key in the global system (since it is not even the latest object version stored locally).

As illustrated in FIG. 5, the method may include the storage system determining whether the latest local object version having the specified key is a delete marker object, as in 530. If not, shown as the negative exit from 530, the local reap analysis may be complete for delete marker objects having the specified key, as in 535. In this case, no additional delete marker objects are stored locally, and any delete marker objects that were stored locally have been deleted. However, as described in more detail below, in some embodiments, delete marker objects stored on one or more other computing nodes and/or data store instances in the distributed storage system having the specified key may be reaped by a periodically initiated global analysis (e.g., at a later time). In other embodiments, whenever a local reap analysis has been completed, the storage system may initiate or set a trigger for a subsequent global reap analysis (e.g., one that may be performed as a background task in the storage system). This is illustrated in FIG. 5 by the dashed line from 535 to 540. In still other embodiments, a global reap analysis may be triggered by the completion of a local reap analysis only if the local reap analysis cannot be completed without additional information obtained from the storage system at large. This is shown in the example illustrated in FIG. 5 by the dashed line from the positive exit from 530 to 540.

In this example, if the latest local object version having the specified key is a delete marker object, shown as the positive exit from 530, the storage system may not be able to determine whether this delete marker can be deleted. In this case, there may or may not be an object version (e.g., a delete marker object or an object version that is not a delete marker) stored on another computing node in the storage system that was more stored more recently than the delete marker object that is the latest local object version. Since the storage system may not be able to determine whether the latest local object version is also the latest global object version based on information available locally (e.g., metadata stored on the computing node on which the local reap analysis is being performed, or in the same block or brick), the storage system may rely on a global reap analysis to perform a comprehensive determination of which, if any, other delete marker objects stored in the distributed storage system are no longer needed to ensure correctness and can be safely deleted. In addition, the storage system may not be able to determine, based on information available locally, whether all remaining object versions stored in the distributed system are delete marker objects (in which case all of them can be deleted). In some embodiments, a global reap analysis may be relied upon to make such a determination in addition to, or instead of, a determination of whether the latest local object version is also the latest global object version.

As illustrated in FIG. 5, at some point (whether initiated or triggered in response to the local reap analysis described above or initiated automatically at a later time, such as on a periodic basis), the storage system may begin a global reap analysis for delete marker objects having the specified key, as in 540. This global reap analysis may in some embodiments include the storage system taking a global snapshot of object versions stored in the system having the specified key, or a global snapshot of all object versions stored in the system, as in 550. For example, in various embodiments, the storage system may take a global snapshot of the stored objects themselves and/or of metadata associated with those stored objects (e.g., their version-ids, time stamps, or other information, such as the information stored in each entry of a key map for the storage system or a bucket thereof). The global reap analysis may include the storage system examining the information in the global snapshot to determine whether all of the objects represented in the snapshot having the specified key are delete marker objects, as in 560. If so, shown as the positive exit from 560, the method may include the storage system deleting all delete marker objects represented in the snapshot having the specified key, as in 565. In this example, this may include deleting any delete marker object that was determined to be the latest local object version stored on one of the computing nodes in the distributed storage system having the specified key. At this point, with no delete marker objects remaining in the distributed storage system, the reap analysis for the specified key may be complete.

If it is determined that not all of the objects represented in the snapshot having the specified key are delete marker objects, shown as the negative exit from 560, the method may include deleting any delete marker object represented in the snapshot that is not the latest object version represented in the snapshot, as in 570. For example, a global snapshot of key map entries (e.g., for a bucket or a portion thereof that contains all of the entries for the specific key) may be examined (or walked) to determine whether one or more delete marker objects that are not the latest global object version are stored anywhere in the system, and any such delete marker objects may be deleted from memory. At this point, at most one delete marker object represented by in the snapshot should be stored anywhere in the distributed storage system, and, if present, this may be the only delete marker object that needs to be stored in the system to ensure correctness. For example, in some embodiments, the presence of this one delete marker object may ensure that a GET type operation that includes the specified key but not a version-id will correctly identify the delete marker object as the latest version of specified key, and will return an error indication (e.g., 404 Object Not Found).

Note that in embodiments that employ the method illustrated in FIG. 5, a delete marker object may only be deleted if it is represented in the snapshot. If any new delete maker objects have been stored in the system between the time the snapshot was taken and the illustrated reap analysis is performed, they may not be automatically deleted by the reap analysis because the information available to the reap analysis (i.e. the snapshot) may not be sufficient to determine whether it would be safe to delete these new delete marker objects. Instead, any new delete maker objects that have been stored in the system between the time the snapshot was taken and the illustrated reap analysis is performed may be evaluated for deletion the next time the reap analysis is performed (during a next periodic global analysis, or during a subsequent a reap analysis performed in response to a mutating operation), using a later snapshot.

Figure 6:
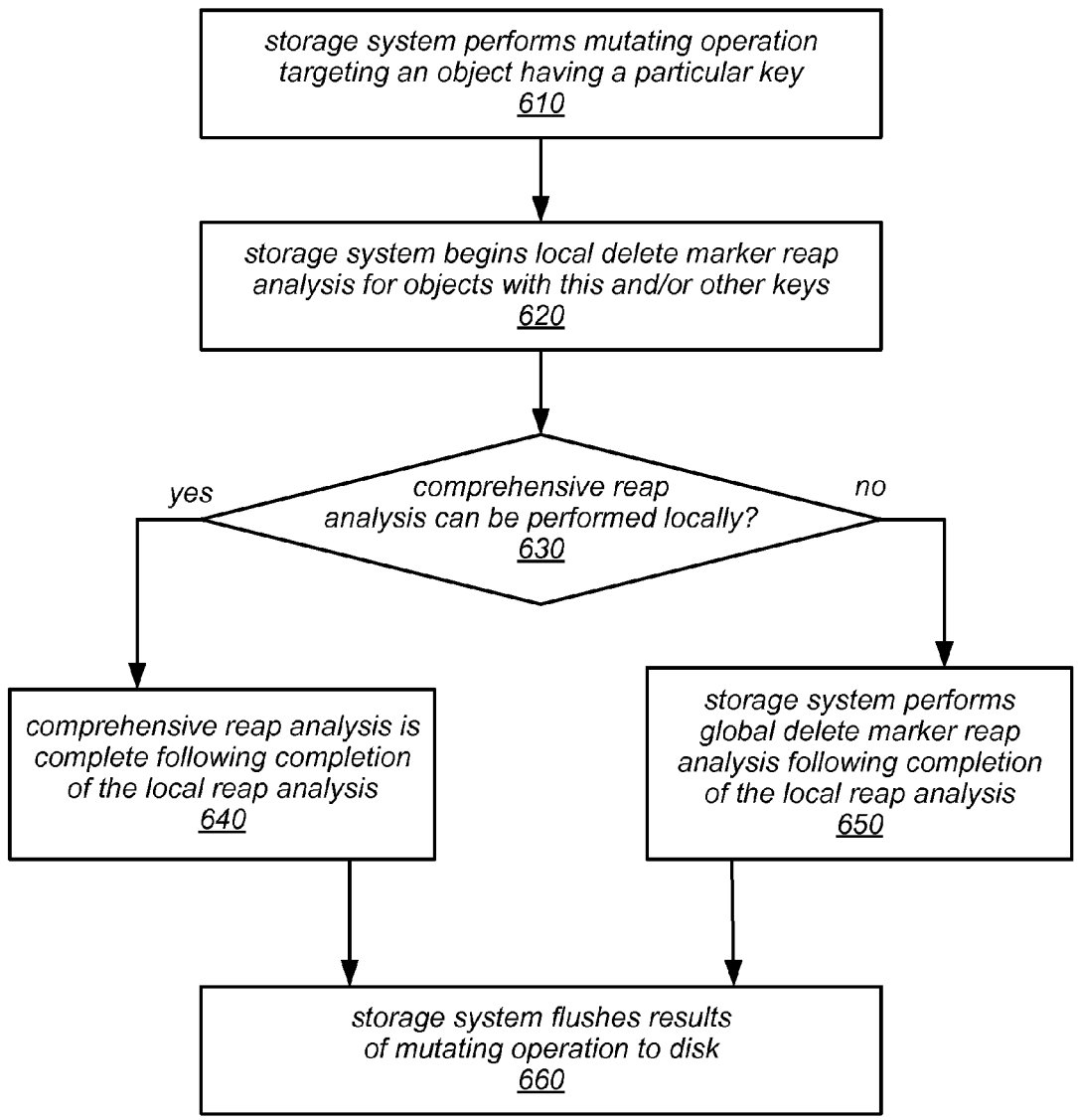
FIG. 6 is a flow diagram illustrating a method for initiating a delete marker object cleanup operation in a distributed storage system, according to one embodiment.

As previously noted, in some embodiments, a delete marker cleanup operation (which may include a local delete marker reap analysis and/or a global delete marker reap analysis) may be initiated in response to performing a mutating operation that specifies a particular key (e.g., prior to flushing modified data to disk or other long-term storage). One embodiment of a method for initiating a delete marker cleanup operation in a distributed storage system is illustrated by the flow diagram in FIG. 6. As illustrated in this example, the method may include the storage system performing a mutating operation targeting an object having a particular key (e.g., a particular user key), as in 610. For example, PUT, WRITE, or DELETE type operations (including COPY operations) may result in creation of a new delete marker object in the system and/or in a change in the version that is the latest version. In response to performing the mutating operation (and prior to flushing any modified data for the stored objects and/or their metadata resulting from the mutating operation), the storage system begin a local delete marker reap analysis, as in 620. For example, the storage system may evaluate at least some of a set of reap conditions for which information about one or more delete marker objects and/or associated metadata is stored locally (e.g., as in FIG. 5, elements 520 and 530). As described herein, these reap conditions may be applied to delete marker objects (and/or metadata associated with those delete marker objects) having the particular user key specified for the mutating operation and/or to delete marker objects (and/or associated metadata) having one or more other keys, depending on the particular delete marker objects (and/or associated metadata) that is stored locally (e.g., on the same computing node or in the same data store instance, block, brick, or replica thereof as the object targeted by the mutating operation), according to different embodiments.

After the storage system performs a local reap analysis to identify any reapable delete markers (those for which one or more reap conditions can be evaluated locally), the method may include the storage system determining whether a comprehensive reap analysis can be performed locally, as in 630. For example, if keymap information for all versions of a user key (which may include one or more delete marker objects) spans multiple blocks, the storage system may not be able to determine if a delete marker object that is the latest local object version is also the latest global object version, or whether all object versions for a given key that are stored in the system are delete marker objects without loading one or more additional blocks (which may be too inefficient, expensive, and/or time consuming to do in-band with the performance of the triggering mutating operation). In addition, in various embodiments, the storage system may or may not be able to determine whether all (or even the least most recent) information is available locally. Note that in some embodiments, there may be information stored locally indicating that stored objects and/or associated metadata for a given key span more than one computing node or data store instance in the distributed system. Note also that in some embodiments, metadata available locally may indicate whether a particular object version (which may be a delete marker object) is the latest version of a given key stored in the system at large.

As illustrated in this example, if the storage system determines that a comprehensive reap analysis can be performed locally, shown as the positive exit from 630, a comprehensive reap analysis may be complete following completion of the local reap analysis, as in 640. Otherwise, i.e. if the storage system determines that a comprehensive reap analysis cannot be performed locally, shown as the negative exit from 630, the method may include the storage system performing a global delete marker reap analysis following the completion of the local reap analysis, as in 650. As described above, a global reap analysis may in various embodiments be event triggered (in which case it may be triggered by the determination that a comprehensive reap analysis cannot be performed locally), or may be performed at pre-determined time intervals (in which case it may be performed at the next pre-determined time). As illustrated in this example, once the local and/or global analyses are complete, the method may include the storage system flushing the results of the mutating operation to disk, as in 660. In some embodiments, by performing a delete marker reap analysis (e.g., a local real analysis, a global reap analysis, or both), and deleting any delete marker objects that no longer need to be stored in the system to ensure correctness, the system may avoid writing data (and/or metadata) to disk that no longer needs to be stored. Note that in some embodiments, flushing any data that was modified by a mutating operation to disk may be performed following a local reap analysis, regardless of whether a global analysis is also needed to complete a comprehensive delete marker cleanup operation for objects and/or metadata having the same key that was specified for the mutating operation or for objects and/or metadata having another key.

As previously noted, in some embodiments, the storage systems described herein may replace a key map entry corresponding to an object that has been actually (as opposed to logically) deleted from memory in the storage system (e.g., a deleted delete marker object or a deleted object that was not a delete marker object) with a key map entry indicating that the object has been deleted. Key map entries that represent deleted objects may be referred to herein as keymap delete marker entries or keymap delete markers, and these keymap delete markers may be used in distributed storage systems that provide eventual consistency to ensure that actual object deletions are consistently eventually reconciled. In some embodiments, these keymap delete markers may be deleted once the corresponding deleted objects have been consistently reconciled in the distributed system. For example, in some embodiments, they may be deleted after a pre-determined time-to-live (TTL) period has passed following the deletion of an object, and the TTL period may be selected based on the length of time after which consistency is guaranteed to be reconciled in the distributed storage system. In other embodiments, criteria other than a TTL may be applied to keymap delete markers to determine whether they are no longer needed for reconciling eventual consistency. For example, extraneous keymap delete markers may be reaped in response to completion of a reconciliation exercise targeting a particular bucket or objects having a specific key, or in response to another event that results in a consistent view of the objects stored on various computing nodes and/or data store instances in the distributed storage system.

Figure 7:
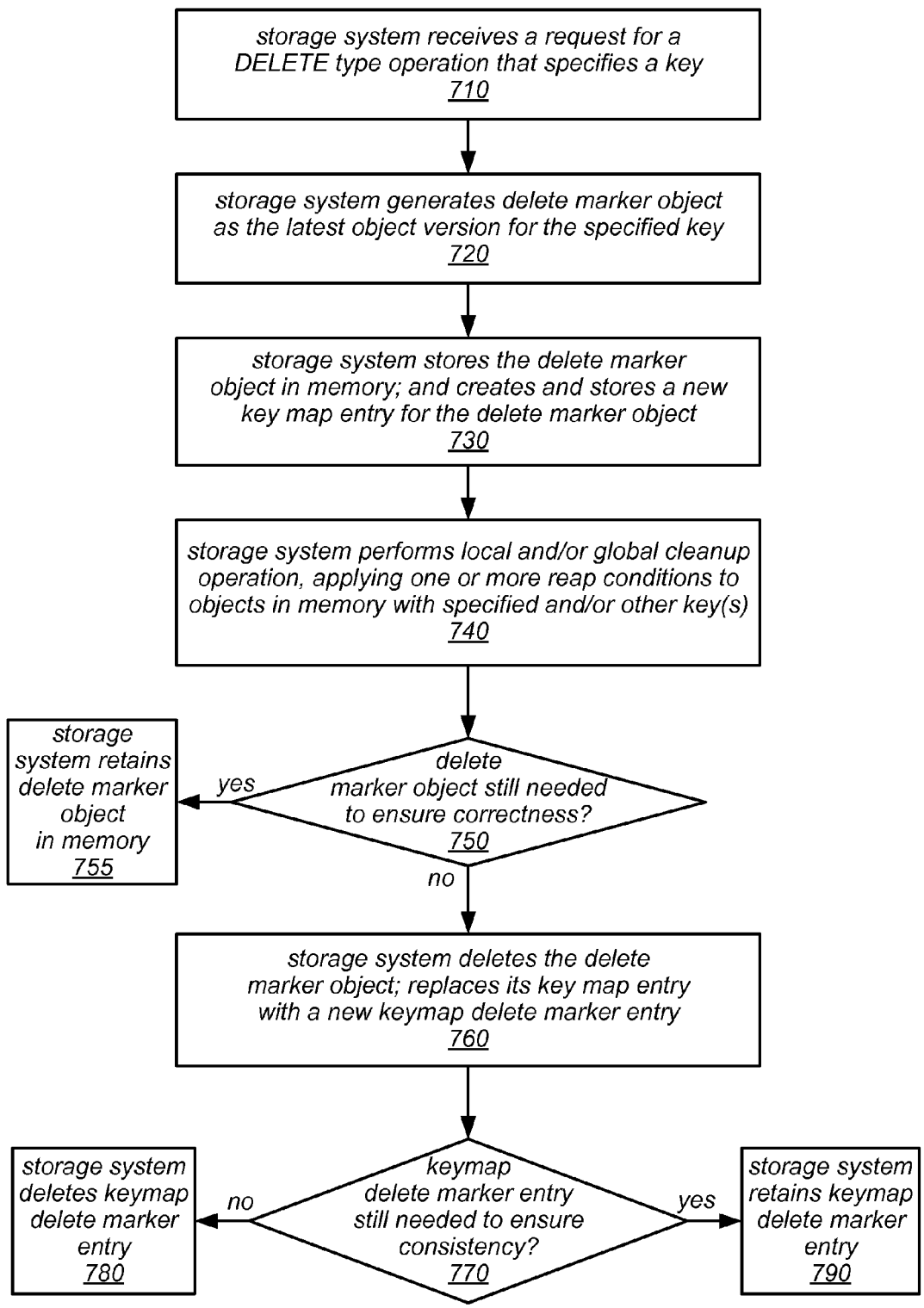
FIG. 7 is a flow diagram illustrating a method for creating, and subsequently deleting, a keymap delete marker entry in an eventually consistent distributed storage system, according to one embodiment.

One embodiment of a method for creating, and then deleting, a keymap delete marker for a delete marker object in an eventually consistent distributed storage system is illustrated by the flow diagram in FIG. 7. As illustrated in this example, the method may include the storage system receiving a request to perform a DELETE type operation that specifies a key (e.g., a user key), as in 710. In some embodiments, if the requester does not have permission to delete the key (or any objects having that key), the storage system may return an error indication (not shown). In response to receiving the request, the storage system may generate a delete marker object as the latest object version for the specified key, as in 720. The storage system may store the delete marker object in memory (e.g., to indicate a logical deletion). The storage system may also create and store a new key map entry for the delete marker object, as in 730 (e.g., it may add an entry for the new delete marker object in a key map, as described herein).

At some point (e.g., in response to performing this DELETE type operation or another mutating operation, or according to a pre-determined delete marker reap analysis schedule), the storage system may perform a local delete marker cleanup operation and/or a global delete marker cleanup operation, applying one or more reap conditions to various delete marker objects stored in memory that have the specified key and/or another key, as in 740. As noted above, local and global analyses may or may not happen serially in response to performance of a single mutating operation, such as the DELETE type operation illustrated in FIG. 7. For example, in some embodiments, a global reap analysis may be performed in-band (e.g., initiation of the global reap analysis may be triggered by the performance of a local reap analysis or a mutating operation, or may be triggered by another event), while in other embodiments a global reap analysis may be performed out-of-band (e.g., the global reap analysis may be performed periodically irrespective of any access operations targeting objects in the storage system or similar events). In still other embodiments, both periodic and event triggered global reap analysis exercises may be performed, e.g., at different times, and/or under different circumstances. For example, a periodic global reap analysis may be performed at pre-determined time intervals only if no triggering events have been detected since the most recent periodic global reap analysis that would (or did) cause a global reap analysis to be performed. As illustrated at 750, in this example, during the cleanup operation(s) the storage system may determine whether the delete marker object is still needed to ensure correct operation of the storage system, as described herein. If so, shown as the positive exit from 750, the storage system may retain the delete marker object in memory, as in 755, and the corresponding entry in the key map (not shown). However, if the delete marker object is no longer needed to ensure correct operation of the storage system, shown as the negative exit from 750, the storage system may delete the delete marker object from memory and (in some embodiments) replace its corresponding entry in the key map with a new keymap delete marker, as in 760.

As illustrated in this example, at some point (e.g., during this or a subsequent cleanup operation, after a pre-determined TTL, or in response to a consistency reconciliation event), the storage system may determine whether the keymap delete marker entry is still needed to ensure consistency, as in 770. If not, shown as the negative exit from 770 and element 780, the storage system may delete the keymap delete marker entry, as described herein. However, if it is determined that the keymap delete marker entry is still needed to ensure consistency, shown as the positive exit from 770, the storage system may retain the keymap delete marker entry, as in 790. Note that in other embodiments (e.g., embodiments in which the key map entry for a reapable delete marker object is removed from the key map, rather than being replaced with a delete marker entry in the key map, if a delete marker object is determined to be extraneous and is removed), the operations illustrated at 770-790 may not be performed.

In some embodiments, a global reap analysis mechanism (i.e. a "global reaper") may be responsible for evaluating particular reap conditions (e.g., conditions C3 and C4 above) without exception. In such embodiments, the global reaper may periodically walk the global key map (or a snapshot thereof), visiting every entry for every key in the key map, evaluating conditions C3 and C4, and issuing a DELETE operation whenever it determines that a delete marker object is reapable. As part of its analysis, the global reaper may in some embodiments also delete keymap delete marker entries (key map entries that represent objects that have been actually, as opposed to logically, deleted) that are no longer needed. To ensure consistency, the global reaper may only delete key map entries that are older than the most recently successfully round of the anti-entropy protocol (i.e. those older than the most recent point at which data stored on multiple computing nodes and/or in multiple data store instances has been reconciled for consistently).

As noted above, in some embodiments, an eventually consistent distributed storage system may perform an automated periodic, global cleanup operation, which may include determining which, if any, delete marker objects stored in the system are no longer needed for correctness and/or determining which, if any, keymap delete marker entries are no longer needed to ensure consistency. In such embodiments, these extraneous delete marker objects and/or keymap delete marker entries may be deleted from memory. One embodiment of a method for determining which, if any, delete marker objects and/or keymap delete marker entries can be deleted is illustrated by the flow diagram in FIG. 8. As illustrated in this example, performing such a global cleanup operation may include the storage system taking a global snapshot of the storage system key map, as in 810. In some embodiments, each entry in the key map snapshot may include the version-id for the corresponding stored object, which may include a sequencer portion indicating the time at which it was created. In other embodiments, the entries of the snapshot may include time stamps, a "latest version indicator" (whose value is "true" if the particular object is the latest version of a key), or other information usable to determine which, if any, delete marker objects and/or keymap delete marker entries are reapable. The storage system may then examine all entries in the key map snapshot that have a specified key (i.e. all key map entries that represent object versions having the specified key), as in 820.

The storage system may determine whether all of the objects represented in the snapshot and having the specified key are delete marker objects, as in 830. If so, shown as the positive exit from 830, the storage system may delete all of the delete marker objects represented in the snapshot and having the specified key, as in 835. Note that, as discussed above, deleting a delete marker object may include replacing a key map entry corresponding to that delete marker object with a new keymap delete marker entry (not shown). If not all of the objects represented in the snapshot and having the specified key are delete marker objects, shown as the negative exit from 830, the storage system may determine whether any delete marker objects represented in the snapshot are not the latest version of the key, as in 840. If so, the storage system may delete those delete marker objects represented in the snapshot that are not the latest version of the specified key, as in 850. At this point, there should be at most one delete marker object represented in the key map having the specified key, which, if present, is the latest object version stored in the system that has the specified key. Therefore, the reap analysis for delete marker objects having the specified key is complete. As illustrated in this example, the operations shown as 820-850 in FIG. 8 may be repeated for each user key for which object versions are represented in the key map. This is shown as the feedback from the positive exit from 860 to 820.

Figure 8:
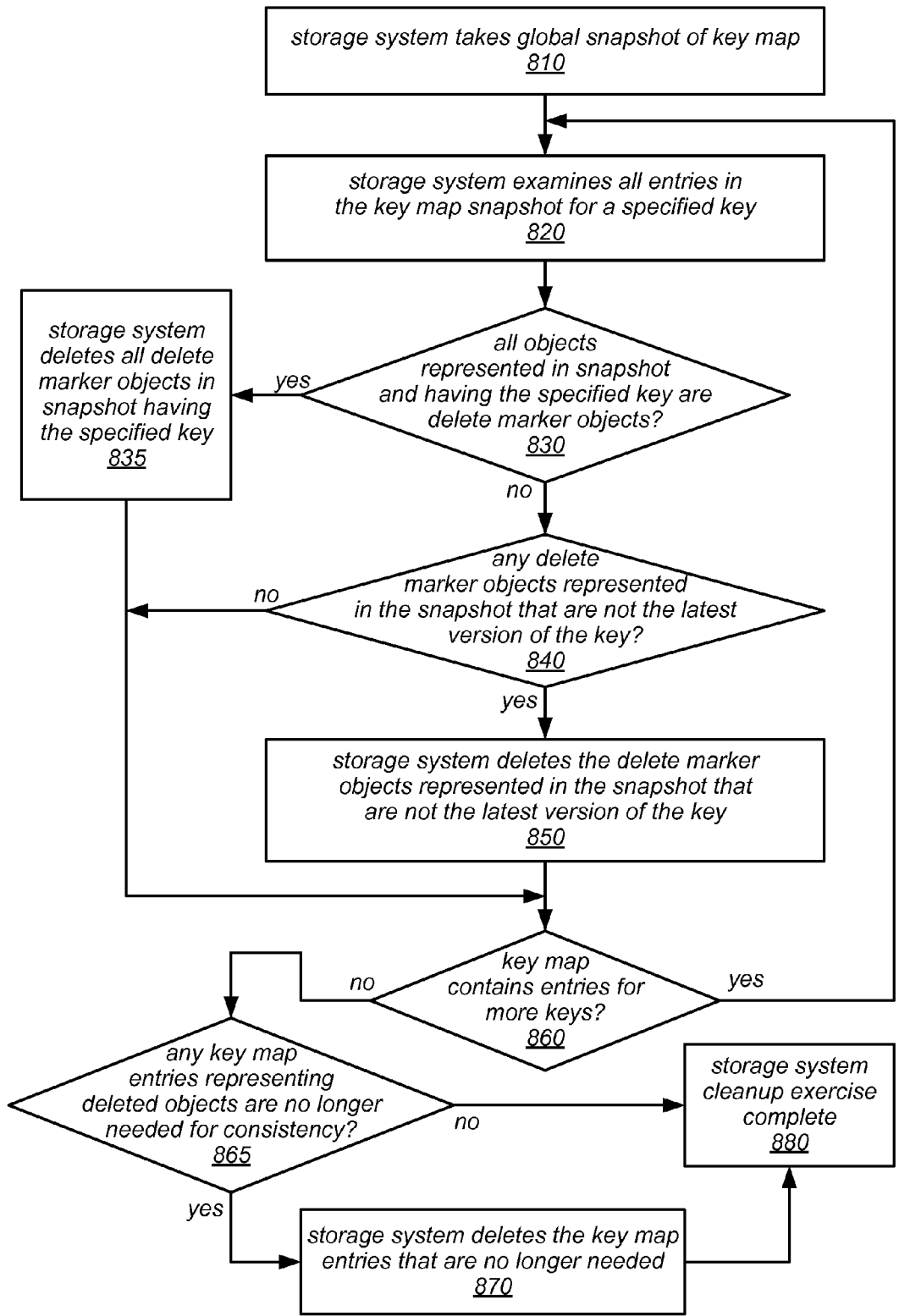
FIG. 8 is a flow diagram illustrating a method for performing a global cleanup operation through which it is determined which, if any, delete marker objects and/or keymap delete marker entries can be deleted, according to one embodiment.

Again note that in embodiments that employ the method illustrated in FIG. 8, a delete marker object may only be deleted if it is represented in the snapshot. If any new delete marker objects have been stored in the system between the time the snapshot was taken and the illustrated reap analysis is performed, they may not be automatically deleted by the reap analysis because the information available to the reap analysis (i.e. the snapshot) may not be sufficient to determine whether it would be safe to delete these new delete marker objects. Instead, any new delete maker objects that have been stored in the system between the time the snapshot was taken and the illustrated reap analysis is performed may be evaluated for deletion the next time the reap analysis is performed (during a next periodic global analysis, or during a subsequent a reap analysis performed in response to a mutating operation), using a later snapshot.

As illustrated in this example, once the key map entries corresponding to delete marker objects for all user keys have been analyzed and any extraneous delete marker objects have been deleted, shown as the negative exit from 860, the method may include determining whether any key map entries representing actual deleted objects (i.e. keymap delete marker entries) are no longer needed for consistency, as in 865. For example, keymap delete marker entries may be reaped according one or more reap conditions applicable to keymap delete marker entries, such as a TTL by which consistency is guaranteed, the presences of evidence (e.g., a time-stamp) indicating the time of the most recent consistency reconciliation, or other reap conditions. If one or more keymap delete marker entries are reapable, shown as the positive exit from 865, the storage system may delete these extraneous keymap delete marker entries, 870. Again note that in other embodiments (e.g., embodiments in which the key map entry for a reapable delete marker object is removed from the key map, rather than being replaced with a delete marker entry in the key map, if a delete marker object is determined to be extraneous and is removed), the operations illustrated at 865-870 may not be performed. While FIG. 8 illustrates an embodiment in which a global cleanup operation performs a delete marker object reap analysis followed by an analysis of keymap delete marker entries, these two types of reap analysis may be performed in separate periodic, synchronized or asynchronous cleanup processes, in other embodiments.

Note that while several examples included herein describe mechanisms for automatically deleting extraneous delete marker objects (i.e. objects created in response to a logical deletion), these techniques may be applied to a process for reaping delete marker objects that are created in response to an actual (rather than a logical) deletion, in other embodiments. For example, in some embodiments, a system may create a delete marker object when a specific object version is deleted by a user, and this delete marker object may facilitate recovery from accidental deletion or the generation of a complete version history for an object (e.g., for objects having a given user key). Attempts to access a deleted object may return and explicit indication of its deletion, rather than a more generic error message (e.g., 404 Object Not Found). In such embodiments, various reap conditions may be applied to the delete marker objects to determine whether they are still useful, dependent on the conventions and/or performance requirements of the storage system. For example, a delete marker may be considered to be extraneous and may be deleted after it has been accessed a pre-determined number of times, if it has not been accessed for a pre-determined time period, if a pre-determined number of other delete marker objects have been added since the creation of the delete marker object, or in response to another reap condition indicating that the delete marker object is no longer useful being met. In some embodiments, as with delete marker objects that indicate a logical deletion, there may be a separate key map entry for a delete marker object that represents an actual deletion, and in response to the deletion of such a delete marker object, a keymap delete marker entry may replace the key map entry for that delete marker object. In such embodiments, the keymap delete marker entry may be deleted from the key map when it is no longer needed to ensure consistency in the storage system.

In some embodiments, the system and methods described herein for versioning of stored objects may be employed by a storage service that provides storage for subscribers as part of a virtualized computing service. In various embodiments, virtualized computing may be offered as an on-demand, paid service to clients, and may include a virtualized storage service, which may in some embodiments support object versioning, as described herein. For example, an enterprise may assemble and maintain the various hardware and software components used to implement virtualized computing, and may offer clients access to these resources according to various pricing models (e.g., usage-based pricing, subscription pricing, etc.). Thus, clients may have access to a range of virtual computing resources without having to incur the costs of provisioning and maintaining the infrastructure needed to implement those resources.

Example Computer System Embodiment

It is contemplated that in some embodiments, any of the methods, techniques or components described herein may be implemented as instructions and data capable of being stored or conveyed via a computer-accessible medium. Such methods or techniques may include, for example and without limitation, various methods of configuring and initializing a storage system that supports versioning, and performing various operations to store, retrieve, modify, delete, and otherwise access data objects and/or metadata thereof, or to automatically delete extraneous delete marker objects stored in that storage system according to the APIs described herein. Such instructions may be executed to perform specific computational functions tailored to specific purposes (e.g., processing web services traffic; performing high-precision numerical arithmetic; storing, retrieving, modifying, deleting, and/or otherwise accessing data objects and/or metadata thereof; maintaining multiple versions of stored data objects, etc.) as well as higher-order functions such as operating system functionality, virtualization functionality, network communications functionality, application functionality, storage system functionality, and/or any other suitable functions.

Figure 9:
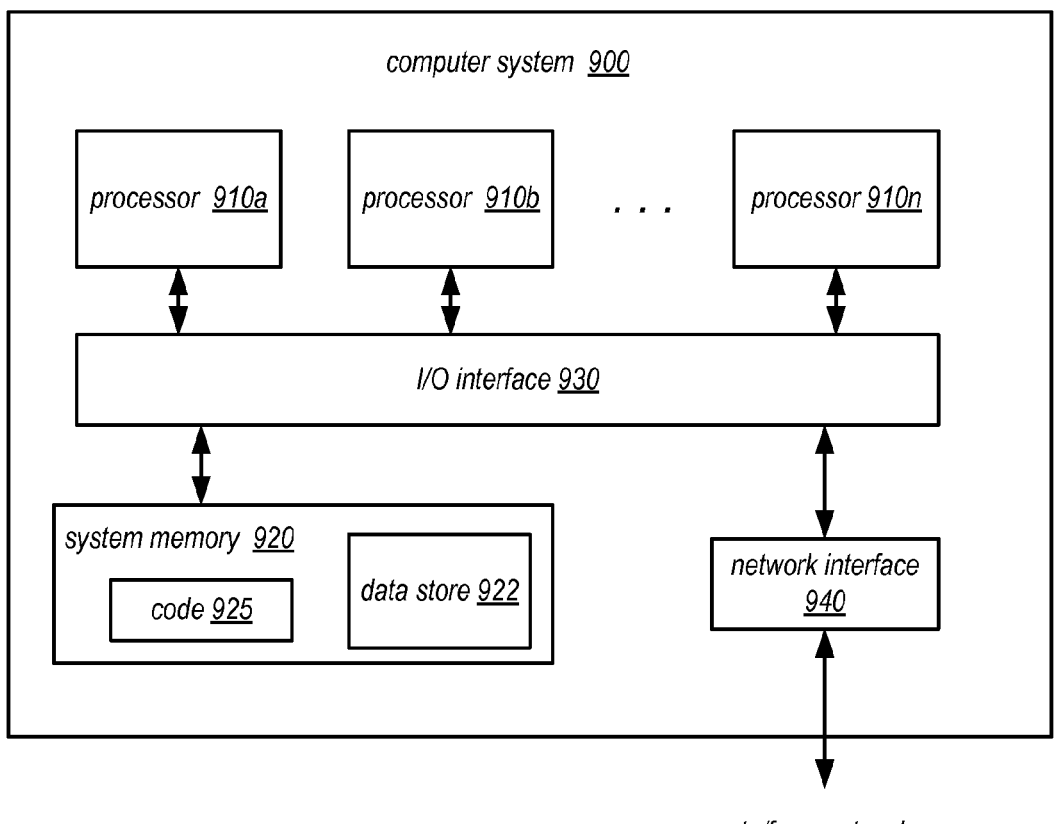
FIG. 9 illustrates one embodiment of a computer system that supports versioning of stored data objects and automated deletion of extraneous delete marker objects, as described herein.

One example embodiment of a computer system that includes computer-accessible media and that supports versioning of stored objects and mechanisms for automatically deleting extraneous delete marker objects, as described herein, is illustrated in FIG. 9. In various embodiments, the functionality of any of the various modules or methods described herein may be implemented by one or several instances of computer system 900. For example, a distributed storage system that supports an eventual consistency model may be implemented by multiple computing nodes, any or all of which may comprise instances of computer 900. In particular, it is noted that different elements of the system described herein may be implemented by different computer systems 900. For example, a storage system that provides the functionality described herein may be implemented on the same computer system 900 on which a client (through which a user/requester accesses the storage system) executes, or on another computer system 900, in different embodiments.

In the illustrated embodiment, computer system 900 includes one or more processors 910 coupled to a system memory 920 via an input/output (I/O) interface 930. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 910 may commonly, but not necessarily, implement the same ISA.

System memory 920 may be configured to store instructions (e.g., code 925) and data (e.g., in data store 922) accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques (such as functionality for supporting versioning of stored data objects, for performing various operations to store, retrieve, modify, delete, and otherwise access data objects and/or metadata thereof on a storage system according to the APIs described herein, or for deleting extraneous delete marker objects), are shown stored within system memory 920 as code 925. It is noted that in some embodiments, code 925 may include instructions and data implementing desired functions that are not directly executable by processor 910 but are represented or encoded in an abstract form that is translatable to instructions that are directly executable by processor 910. For example, code 925 may include instructions specified in an ISA that may be emulated by processor 910, or by other code 925 executable on processor 910. Alternatively, code 925 may include instructions, procedures or statements implemented in an abstract programming language that may be compiled or interpreted in the course of execution. As non-limiting examples, code 925 may include code specified in a procedural or object-oriented programming language such as C or C++, a scripting language such as perl, a markup language such as HTML or XML, or any other suitable language. In some embodiments, objects (e.g., data objects and/or delete marker objects in one or more buckets) and/or metadata associated with those objects (e.g., in a key map) may be stored in a data store 922 within system memory 920.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (not shown), such as other computer systems, for example. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 920 may include a non-transitory, computer-accessible storage medium configured to store instructions and data as described above. However, in other embodiments, instructions and/or data may be received, sent or stored upon different types of computer-accessible storage media. Generally speaking, a computer-accessible storage medium may include storage media or memory media such as magnetic or optical media, e.g., disk or CD/DVD-ROM coupled to computer system 900 via I/O interface 930. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 900 as system memory 920 or another type of memory. A computer-accessible storage medium may generally be accessible via transmission media or signals such as electrical, electromagnetic, or digital signals, conveyed via a communication medium such as a network and/or a wireless link, such as may be implemented via network interface 940.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a data storage system that stores a plurality of objects,
     wherein the data storage system supports versioning
     wherein multiple versions of one or more of the plurality of objects are stored in the data storage system;
     wherein the plurality of objects stored in the data storage system comprises a plurality of delete marker objects, wherein each of the delete marker objects is a version of an object representing a logical deletion of the object, wherein a logical deletion of the object results in a delete marker object being created for the object as a version of the object while refraining from deleting the object from the data storage system; and
   one or more computing devices comprising one or more processors and memory coupled to the one or more processors storing program instructions that when executed by the one or more processors cause the one or more processors to:
     determine whether one or more delete marker objects of the plurality of delete marker objects stored in the data storage system are no longer needed based on one or more removal conditions, wherein the one or more removal conditions comprise:
  a determination that all versions of a particular object stored in the data storage system are delete marker objects, or
  a determination that a particular delete marker object is not the latest version of a respective object stored in the data storage system; and
in response to determining that the one or more delete marker objects are no longer needed, delete the one or more delete marker objects from the data storage system.

2. The system of claim 1, wherein the program instructions when executed by the one or more processors cause the one or more processors to:
  determine whether one or more delete marker objects of the plurality of delete marker objects stored in the data storage system are no longer needed based on the one or more removal conditions at scheduled intervals.

3. The system of claim 1, wherein the program instructions when executed by the one or more processors further cause the one or more processors to:
  perform one or more mutating operations on one or more objects stored in the data storage system;
  wherein, said determine whether one or more delete marker objects of the plurality of delete marker objects stored in the data storage system are no longer needed based on the one or more removal conditions is performed in response to performance of the one or more mutating operations.

4. The system of claim 3, wherein the program instructions when executed by the one or more processors further cause the one or more processors to:
  determine whether one or more delete marker objects of the plurality of delete marker objects stored in the data storage system are no longer needed based on the one or more removal conditions at scheduled intervals;
  wherein, subsequent to performing the determination of whether the one or more delete marker objects of the plurality of delete marker objects stored in the data storage system are no longer needed in response to performing the one or more mutating operations, the program instructions when executed by the one or more processors further cause the one or more processors to:
    delay and/or skip a scheduled interval of determining whether the one or more delete marker objects of the plurality of delete marker objects stored in the data storage system are no longer needed.

5. The system of claim 1, wherein the data storage system is a distributed storage system comprising a plurality of computing nodes on which objects are stored;
  wherein the program instructions when executed by the one or more processors further cause the one or more processors to:
    apply the one or more removal conditions locally;
    wherein to apply the one or more removal conditions locally the program instructions when executed further cause the one or more processors to apply the one or more removal conditions only to delete marker objects that are stored on a single computing node in the distributed storage system.

6. The system of claim 1, wherein the data storage system is a distributed storage system comprising a plurality of computing nodes on which objects are stored;
  wherein the program instructions when executed by the one or more processors further cause the one or more processors to:
    apply the one or more removal conditions globally;
    wherein to apply the one or more removal conditions globally the program instructions when executed further cause the one or more processors to apply the one or more removal conditions to one or more delete marker objects that are one or more versions of a plurality of versions of an object, wherein the plurality of versions of the object are stored on two or more computing nodes in the distributed storage system.

7. The system of claim 1, wherein each of the plurality of objects stored in the data storage system is collectively identified based on a key and a version identifier; and
wherein each delete marker object of the plurality of delete marker objects is identified based on a same key as the respective logically deleted object that the delete marker object represents, and based on a new, unique version identifier.

8. A method, comprising:
  performing, by a computer system of a distributed storage system that stores a plurality of objects, wherein the distributed storage system supports versioning wherein multiple versions of one or more of the plurality of objects are stored in the distributed storage system:
    determining if one or more triggering events for a delete marker removal analysis has occurred, wherein the one or more triggering events comprise:
      an occurrence of a removal interval, or
      performance of one or more mutating operations on one or more of the plurality of objects;
    determining, in response to determining one or more triggering events have occurred, whether one or more delete marker objects of a plurality of delete marker objects are no longer needed based on one or more delete marker removal conditions; and
    in response to determining that the one or more delete marker objects are no longer needed, deleting the one or more delete marker object,
  wherein each of the plurality of delete marker objects is a version of an object representing a logical deletion of the object, wherein a logical deletion of the object results in a delete marker object for the object being created while refraining from deleting the object.

9. The method of claim 8, wherein the one or more delete marker removal conditions comprise a determination that all versions of a particular object stored in the distributed storage system are delete marker objects.

10. The method of claim 8, wherein the one or more delete marker removal conditions comprise a determination that a particular delete marker object is not the latest version of a respective object stored in the distributed storage system.

11. The method of claim 8, wherein said performing by the computer system further comprises:
  causing a removal interval to occur in response to an amount of time since a last occurrence of the one or more triggering events exceeding a threshold amount of time.

12. The method of claim 8,
  wherein the computer system is a distributed storage system comprising a plurality of computing nodes on which objects are stored;
  wherein said determining whether the one or more delete marker objects of the plurality of delete marker objects are no longer needed based on the one or more delete marker removal conditions comprises applying the one or more delete marker removal conditions locally; and wherein applying the one or more delete marker removal conditions locally comprises applying the one or more delete marker removal conditions only to delete marker objects that are stored on a single computing node in the distributed storage system.

13. The method of claim 8,
wherein the computer system is a distributed storage system comprising a plurality of computing nodes on which objects are stored;
wherein said determining whether the one or more delete marker objects of the plurality of delete marker objects are no longer needed based on the one or more delete marker removal conditions comprises applying the one or more delete marker removal conditions globally; and
wherein applying the one or more delete marker removal conditions globally comprises applying the one or more delete marker removal conditions to a particular delete marker object that is a version of a plurality of versions of an object, wherein the plurality of versions of the object are stored on two or more computing nodes in the distributed storage system.

14. The method of claim 13, wherein the one or more delete marker removal conditions comprise a determination that all objects stored in the two or more nodes in the distributed data storage system that are versions of the particular delete marker object are other delete marker objects.

15. The method of claim 8, wherein each of the plurality of objects is collectively identified based on a key and a version identifier; and wherein each delete marker object of the plurality of delete marker objects is identified based on a same key as a respective logically deleted object that the delete marker object represents, and based on a new, unique version identifier.

16. The method of claim 15,
wherein the computer system is a distributed storage system comprising a plurality of computing nodes on which objects are stored, and wherein the distributed storage system ensures eventual consistency; and
wherein said deleting comprises creating one or more delete marker entries for the one or more delete marker objects in one or more key maps, wherein a key map comprises a plurality of entries storing information usable in reconciling eventual consistency in the distributed storage system, and wherein each entry in a key map represents a respective object stored in the distributed storage system.

17. A non-transitory, computer-readable storage medium storing program instructions that when executed on one or more computers of a distributed storage system that stores a plurality of objects and supports versioning wherein multiple versions of one or more of the plurality of objects are stored in the distributed storage system, cause the one or more computers to:
determine if one or more triggering events for a delete marker removal analysis has occurred, wherein the one or more triggering events comprise:
an occurrence of a removal interval, or
performance of one or more mutating operations on one or more of the plurality of objects stored in the distributed storage system;
determine, in response to determining the one or more triggering events have occurred, whether one or more delete marker objects of a plurality of delete marker objects are no longer needed based on one or more delete marker removal conditions, wherein each of the plurality of delete marker objects is a version of an object representing a logical deletion of the object, wherein a logical deletion of the object results in a delete marker object for the object being created while refraining from deleting the object; and
in response to determining that the one or more delete marker objects are no longer needed, delete the one or more delete marker objects.

18. The non-transitory computer-readable medium of claim 17, wherein the one or more delete marker removal conditions comprise a determination that all versions of a particular object stored in the distributed storage system are delete marker objects.

19. The non-transitory computer-readable medium of claim 17, wherein the one or more delete marker removal conditions comprise a determination that a particular delete marker object is not the latest version of a corresponding object stored in the distributed storage system.

20. The non-transitory computer-readable storage medium of claim 17, wherein each of the plurality of objects is collectively identified based on a key and a version identifier; and wherein each delete marker object of the plurality of delete marker objects is identified based on a same key as a respective logically deleted object that the delete marker object represents, and based on a new, unique version identifier.

* * * * *